United States Patent
Kamoshida et al.

(10) Patent No.: US 11,760,697 B2
(45) Date of Patent: Sep. 19, 2023

(54) DISPERSION FOR SILICON CARBIDE SINTERED BODY, GREEN SHEET FOR SILICON CARBIDE SINTERED BODY AND PREPREG MATERIAL FOR SILICON CARBIDE SINTERED BODY USING THE SAME, AND MANUFACTURING METHOD THEREOF

(71) Applicant: FUJIMI INCORPORATED, Kiyosu (JP)

(72) Inventors: Keigo Kamoshida, Kiyosu (JP); Souma Taguchi, Kiyosu (JP); Keiji Ashitaka, Kiyosu (JP); Naoya Miwa, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 338 days.

(21) Appl. No.: 17/042,404

(22) PCT Filed: Mar. 26, 2019

(86) PCT No.: PCT/JP2019/012991
§ 371 (c)(1),
(2) Date: Sep. 28, 2020

(87) PCT Pub. No.: WO2019/189254
PCT Pub. Date: Oct. 3, 2019

(65) Prior Publication Data
US 2021/0139382 A1 May 13, 2021

(30) Foreign Application Priority Data

Mar. 30, 2018 (JP) ................................. 2018-069109
Mar. 30, 2018 (JP) ................................. 2018-069128

(51) Int. Cl.

| | |
|---|---|
| C04B 35/80 | (2006.01) |
| C04B 35/626 | (2006.01) |
| C04B 35/628 | (2006.01) |
| C04B 35/634 | (2006.01) |
| C04B 35/64 | (2006.01) |
| B28B 19/00 | (2006.01) |

(52) U.S. Cl.
CPC .......... *C04B 35/80* (2013.01); *C04B 35/6264* (2013.01); *C04B 35/62802* (2013.01); *C04B 35/62813* (2013.01); *C04B 35/6342* (2013.01); *C04B 35/63416* (2013.01); *C04B 35/64* (2013.01); *B28B 19/0046* (2013.01); *C04B 2235/386* (2013.01); *C04B 2235/3826* (2013.01); *C04B 2235/5244* (2013.01); *C04B 2235/5256* (2013.01); *C04B 2235/5436* (2013.01); *C04B 2235/616* (2013.01)

(58) Field of Classification Search
CPC ................ C04B 35/80; C04B 35/6264; C04B 35/62802; C04B 35/63416; C04B 35/6342; C04B 35/64; C04B 2235/3826; C04B 2235/386; C04B 2235/5244; C04B 2235/5256; C04B 2235/5436; C04B 2235/616
See application file for complete search history.

(56) References Cited

U.S. PATENT DOCUMENTS

| | | | |
|---|---|---|---|
| 5,165,996 A | 11/1992 | Jacobson | |
| 5,236,875 A | 8/1993 | Trigg | |
| 10,322,975 B2 * | 6/2019 | Hinoki | ................. C04B 35/565 |
| 2003/0109588 A1 * | 6/2003 | Schmidt | ............ C04B 35/62834 |
| | | | 516/20 |
| 2007/0191209 A1 * | 8/2007 | Hyuga | .................. C04B 35/591 |
| | | | 501/87 |
| 2016/0060112 A1 * | 3/2016 | Nishi | ....................... C08K 3/38 |
| | | | 252/74 |
| 2016/0122251 A1 * | 5/2016 | Hinoki | .................. C04B 35/565 |
| | | | 501/88 |
| 2018/0369908 A1 | 12/2018 | Muto | |

FOREIGN PATENT DOCUMENTS

| | | | | |
|---|---|---|---|---|
| EP | 2 962 993 A1 | | 1/2016 | |
| JP | S62-96367 A | | 5/1987 | |
| JP | S6296367 A | * | 5/1987 | ............. C04B 35/56 |
| JP | H01-290560 A | | 11/1989 | |
| JP | H02-22179 A | | 1/1990 | |
| JP | H02-267167 A | | 10/1990 | |

(Continued)

OTHER PUBLICATIONS

Extended European Search Report issued in corresponding European Patent Application No. 19777660.2 dated Apr. 6, 2021.

(Continued)

*Primary Examiner* — Noah S Wiese
(74) *Attorney, Agent, or Firm* — Foley & Lardner LLP

(57) ABSTRACT

Provided are a dispersion for a silicon carbide sintered body having a small environmental load, high dispersibility, and excellent temporal stability, and a manufacturing method thereof.

The dispersion is a dispersion for a silicon carbide sintered body, containing: silicon carbide particles; boron nitride particles; a resin having a hydroxyl group; and water, wherein the dispersion has a pH at 25° C. of less than or equal to 7.0, and the silicon carbide particles and the boron nitride particles have charges of the same sign. The dispersion is manufactured by a manufacturing method of a dispersion for a silicon carbide sintered body, including a mixing step of mixing a water dispersion containing silicon carbide particles, a water dispersion containing boron nitride particles, and an aqueous solution containing a resin having a hydroxyl group.

16 Claims, No Drawings

(56) References Cited

FOREIGN PATENT DOCUMENTS

| | | |
|---|---|---|
| JP | H05-501243 A | 3/1993 |
| JP | H05-279139 A | 10/1993 |
| JP | H05-507263 A | 10/1993 |
| JP | 2015-44147 A | 3/2015 |
| JP | 6076459 B | 2/2017 |
| WO | WO-91/18841 A1 | 12/1991 |
| WO | WO-2017/099250 A1 | 6/2017 |

OTHER PUBLICATIONS

JP Office Action in JP Appl. Ser. No. 2020-510961 dated Sep. 6, 2022, with translation (10 pages).
Office Action of corresponding European Patent Application No. 19777660.2, dated Jan. 25, 2023.

* cited by examiner

DISPERSION FOR SILICON CARBIDE SINTERED BODY, GREEN SHEET FOR SILICON CARBIDE SINTERED BODY AND PREPREG MATERIAL FOR SILICON CARBIDE SINTERED BODY USING THE SAME, AND MANUFACTURING METHOD THEREOF

TECHNICAL FIELD

The present invention relates to a dispersion for a silicon carbide sintered body, a green sheet for a silicon carbide sintered body and a prepreg material for a silicon carbide sintered body using the same, and a manufacturing method thereof.

BACKGROUND ART

Silicon carbide (SiC) has a high hardness, is excellent in high-temperature thermal resistance, a mechanical strength, shock resistance, abrasion resistance, oxidation resistance, and corrosion resistance, and has a small thermal expansion coefficient, and thus, has been expected to be applied to various applications such as a polishing composition or a high-temperature structure member.

In the application of the silicon carbide, it has been considered that particulate silicon carbide (silicon carbide particles, SiC particles) is used by being dispersed in a dispersing medium or a polymer material medium or is used by being mixed with inorganic particles such as other ceramic particles, at the time of forming a desired composition or a desired material. In addition, in order to improve the functions of a dispersion or a mixture containing silicon carbide particles, a molded body or a sintered body to be formed therefrom, and the like, a dispersion containing silicon carbide particles in which silicon carbide particles have high dispersibility with respect to a medium and can also be homogeneously dispersed with respect to inorganic particles such as other ceramic particles is particularly desirable.

In JP H2-22179 A, a technology is described in which a dispersion is prepared by dispersing silicon carbide (SiC) whisker in a medium along with other ceramic particles such as $Si_3N_4$, and a sintered body is prepared by sintering the dispersion. In JP H2-22179 A, it is described that a zeta potential between the silicon carbide whisker and the other ceramic particles is adjusted by adjusting the pH of the dispersion, and thus, a sintered body in a state where the particles are homogeneously mixed can be obtained.

SUMMARY OF INVENTION

It has been known that boron nitride (BN) is a hard material, and it has been expected to improve thermal shock resistance and mechanical workability of a sintered body containing silicon carbide by combining boron nitride with silicon carbide particles. At this time, in order for a silicon carbide sintered body prepared by using a dispersion containing silicon carbide particles and boron nitride particles that are inorganic particles to obtain a sufficient strength, it is necessary that the silicon carbide particles and the boron nitride particles are stably and homogeneously dispersed in the dispersion. In addition, in order to efficiently manufacture the silicon carbide sintered body by using the dispersion, the dispersion is required to be excellent in temporal stability. However, in a case where boron nitride particles are used as inorganic particles, it has been found that in the technology according to JP H2-22179 A, sufficient dispersibility of the silicon carbide particles and the boron nitride particles in the medium and temporal stability of the dispersion are not obtained. In addition, it is necessary to add a binder in order to apply the above-mentioned material to a complicated shape, but at this time, it is general to use an organic solvent as a medium, which is not preferable from the viewpoint of an environmental load.

Therefore, the present invention has been made in consideration of the problems described above, and an object thereof is to provide a dispersion for a silicon carbide sintered body that has a small environmental load, high dispersibility, and excellent temporal stability, and a manufacturing method thereof.

In order to attain the object described above, the present inventors have conducted intensive studies. As a result thereof, it has been found that, by using water as a main dispersing medium, using boron nitride particles as inorganic particles, adding a resin having a hydroxyl group, controlling a pH of the dispersion such that the pH is in a predetermined range and controlling charges on the surface of silicon carbide particles and the boron nitride particles such that the charges have the same sign, the object is attained, and the present invention has been completed.

That is, the object of the present invention is attained by the following means;

a dispersion for a silicon carbide sintered body, containing:
  silicon carbide particles;
  boron nitride particles;
  a resin having a hydroxyl group; and
  water,
  wherein the dispersion has a pH at 25° C. of less than or equal to 7.0, and the silicon carbide particles and the boron nitride particles have charges of the same sign.

In addition, the object of the present invention is attained by the following means;

a manufacturing method of a dispersion for a silicon carbide sintered body, including a mixing step of mixing
  a water dispersion containing silicon carbide particles,
  a water dispersion containing boron nitride particles, and
  an aqueous solution containing a resin having a hydroxyl group,
  wherein the silicon carbide particles and the boron nitride particles have charges of the same sign, and a pH of the dispersion for a silicon carbide sintered body at 25° C. is less than or equal to 7.0.

DESCRIPTION OF EMBODIMENTS

Hereinafter, the present invention will be described. Note that, the present invention is not limited only to the following embodiment.

Herein, "X to Y" representing a range indicates "greater than or equal to X and less than or equal to Y". In addition, herein, unless stated otherwise, an operation and a measurement of physical properties or the like are performed in a condition of room temperature (20° C. to 25° C.)/relative humidity of 40% RH to 50% RH.

<Dispersion for Silicon Carbide Sintered Body>

One aspect of the present invention is a dispersion for a silicon carbide sintered body, containing: silicon carbide particles; boron nitride particles; a resin having a hydroxyl group; and water, wherein the dispersion has a pH at 25° C. of less than or equal to 7.0, and the silicon carbide particles and the boron nitride particles have charges of the same sign.

One aspect of the present invention is a manufacturing method of a dispersion for a silicon carbide sintered body, including a mixing step of mixing a water dispersion containing silicon carbide particles, a water dispersion containing boron nitride particles, and an aqueous solution containing a resin having a hydroxyl group, in which the silicon carbide particles and the boron nitride particles have charges of the same sign, and a pH of the dispersion for a silicon carbide sintered body at 25° C. is less than or equal to 7.0. Herein, the dispersion for a silicon carbide sintered body that is obtained by the manufacturing method of the present invention is also referred to as a "dispersion according to the present invention".

According to the present invention, a dispersion for a silicon carbide sintered body having a small environmental load, high dispersibility, and high temporal stability, and a manufacturing method thereof are provided.

The present inventors have assumed the mechanism in which the object described above is attained by the present invention, as follows.

It is advantageous to use water as a medium of the dispersion for a silicon carbide sintered body in an environmental load or a waste water treatment cost, compared to the case of using an organic solvent. However, in general, in the case of using water as the medium, the charges of silicon carbide particles and inorganic particles greatly affect the aggregability of the particles in the dispersion, compared to the case of using the organic solvent. For this reason, it is difficult to homogeneously disperse the silicon carbide particles and the inorganic particles. In addition, it is difficult to retain the dispersion at a stable viscosity for a long time. As a result thereof, when a sintered body is prepared by using the dispersion, a sufficient strength is not capable of being obtained.

In the dispersion (a water dispersion) containing the silicon carbide particles, the boron nitride particles, and the resin having a hydroxyl group, as represented in the following formula, the boron nitride particles and the resin having a hydroxyl group are reacted and bonded together, and form a complex, and thus, gelation occurs, in an alkaline condition in which the pH at 25° C. is greater than 7.0. As a result thereof, it is considered that the viscosity of the dispersion increases over time. In contrast, it is considered that when the pH of the dispersion is set to less than or equal to 7.0, it is difficult for the reaction to proceed, and thus, the viscosity is stably retained.

[Chemical Formula 1]

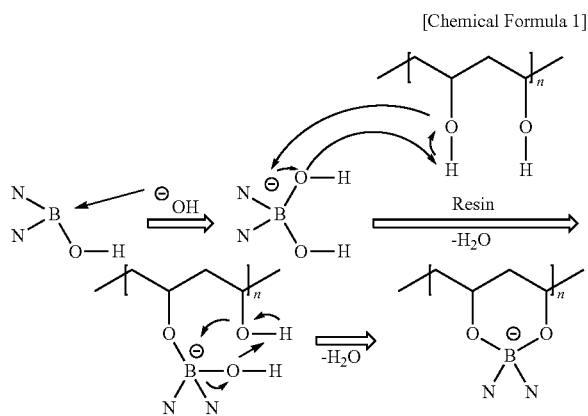

Further, it is found that the silicon carbide particles and the boron nitride particles are made to have the charges of the same sign in a condition in which the pH at 25° C. is less than or equal to 7.0, and thus, dispersing stability is improved.

Note that, the mechanism is based on an assumption, and the correctness thereof does not affect the technical scope of the present invention.

In addition, in the dispersion of the present invention, it is preferable that at least one of the silicon carbide particles and the boron nitride particles is subjected to charge control. Accordingly, it is possible to further increase the dispersibility and the dispersing stability by adjusting a zeta potential on the surface of the particles. It is more preferable that in the dispersion of the present invention, both of the silicon carbide particles and the boron nitride particles are subjected to charge control.

<Silicon Carbide (SiC) Particles>

The silicon carbide (SiC) particles have a high hardness, are excellent in high-temperature thermal resistance, a mechanical strength, shock resistance, abrasion resistance, oxidation resistance, and corrosion resistance, and have a small thermal expansion coefficient, and thus, can be used in various applications such as a polishing composition or a high-temperature structure member.

The silicon carbide particles are not particularly limited, but in a case where the silicon carbide particles are subjected to charge control by being coated with a coating layer containing a charge control component, it is preferable to maintain a state in which the silicon carbide particles are dispersed in a dispersing medium from the generating of the particles to the coating with the coating layer. By maintaining the state in which the silicon carbide particles are dispersed in the dispersion from the generating of the silicon carbide particles to the coating with the coating layer, it is possible to avoid the aggregation of the silicon carbide particles due to drying. Accordingly, high dispersibility of the silicon carbide particles at a time point of being generated is maintained at a higher level even in a state in which the silicon carbide particles are coated with the coating layer, and thus, extremely high dispersibility of the silicon carbide particles coated with the coating layer can be obtained.

An average primary particle size of the silicon carbide particles is not particularly limited, but is preferably less than or equal to 900 nm. In a case where the average primary particle size is in the range, a dispersion having higher dispersibility can be obtained. From the same viewpoint, the average primary particle size of the silicon carbide particles is more preferably less than or equal to 700 nm, and is even more preferably less than or equal to 600 nm. In addition, the average primary particle size of the silicon carbide particles is not particularly limited, but is preferably greater than or equal to 1 nm. In a case where the average primary particle size is in the range, it is possible to further improve the function of the silicon carbide particles. From the same viewpoint, the average primary particle size of the silicon carbide particles is more preferably greater than or equal to 5 nm, and is even more preferably greater than or equal to 10 nm. Here, the value of the average primary particle size of the silicon carbide particles can be calculated on the basis of an average value of a specific surface area (SA) of the silicon carbide particles that is calculated from a value consecutively measured three to five times by a BET method, by using the value of a true density of the silicon carbide particles and by assuming the shape of the silicon carbide particles as a true sphere. The specific surface area of the silicon carbide particles, for example, can be measured by using Flow Sorb II 2300 manufactured by Micromeritics Instrument Corporation.

It is preferable that an average secondary particle size of the silicon carbide particles is less than 2 μm. In a case where the average secondary particle size is in the range, a dispersion having higher dispersibility can be obtained. From the same viewpoint, the average secondary particle size of the silicon carbide particles is more preferably less than or equal to 1.9 μm, is even more preferably less than or equal to 1.8 μm, is still even more preferably less than 1.5 μm, is particularly preferably less than 1.0 μm, and is most preferably less than 0.5 μm. In addition, it is preferable that the average secondary particle size of the silicon carbide particles is greater than or equal to 0.03 μm. In a case where the average secondary particle size is in the range, it is possible to perform charge control by coating with the coating layer with a high efficiency. From the same viewpoint, the average secondary particle size of the silicon carbide particles is preferably greater than or equal to 0.05 μm, and is more preferably greater than or equal to 0.1 μm. Here, the value of the average secondary particle size of the silicon carbide particles can be measured by a scattering particle size distribution measurement apparatus LA-950 manufactured by HORIBA, Ltd. Note that, the details of a measurement method will be described in Examples.

Here, a ratio of the average secondary particle size to the average primary particle size of the silicon carbide particles (Average Secondary Particle Size/Average Primary Particle Size) is not particularly limited, but is preferably less than or equal to 10. According to such a range, the dispersibility is further improved. From the same viewpoint, the ratio of the average secondary particle size to the average primary particle size of the silicon carbide particles is more preferably less than or equal to 8, and is even more preferably less than or equal to 6. In addition, the ratio of the average secondary particle size to the average primary particle size of the silicon carbide particles is not particularly limited, but is preferably greater than or equal to 1.5. According to such a range, the productivity is further improved. From the same viewpoint, the ratio of the average secondary particle size to the average primary particle size of the silicon carbide particles is more preferably greater than or equal to 2, is even more preferably greater than or equal to 2.5, and is particularly preferably greater than or equal to 3.

In addition, a commercially available product may be used, or a synthetic product may be used, as the silicon carbide particles. The commercially available product is not particularly limited, and for example, GC #40000 and GC 8000S manufactured by FUJIMI INCORPORATED, and the like, can be used.

The silicon carbide particles may be used singly or may be used as a composite thereof, or two or more types thereof may be used by being mixed.

<Water Dispersion Containing Silicon Carbide Particles>

A manufacturing method of the water dispersion containing silicon carbide particles, that is, a procedure and a method for dispersing the silicon carbide particles in a dispersing medium containing water are not particularly limited, and a known procedure and a known method of the related art can be used.

It is preferable that water that is used in the manufacturing method of the water dispersion containing silicon carbide particles is water containing minimum impurities. For example, water is preferable in which a total content of transition metal ions is less than or equal to 100 ppb. Here, the purity of water, for example, can be increased by an operation such as the removal of impurity ions using an ion exchange resin, the removal of foreign substances using a filter, and distillation. Specifically, it is preferable to use, for example, deionized water (ion exchange water), pure water, ultrapure water, distilled water, and the like, as water.

In addition, it is possible to use a water dispersion containing coated silicon carbide particles that are obtained by a manufacturing method of coated silicon carbide particles including a coating layer containing a charge control component (coated silicon carbide particles) described below.

As described below, the water dispersion containing silicon carbide particles is capable of containing a dispersing medium other than water. The dispersing medium is preferably only water, from the viewpoint of a small environmental load.

<Charge Control of Silicon Carbide Particles>

In the dispersion of the present invention, silicon carbide particles subjected to charge control can be used. The charge control of the silicon carbide particles is not particularly limited, but a method of adjusting a surface charge by forming a layer of other components (the charge control component) on the surface of the silicon carbide particles to be the coated silicon carbide particles is exemplified. Examples of the charge control component include an oxide such as silicon dioxide, aluminum oxide, titanium oxide, and zirconium oxide, or a hydroxide such as aluminum hydroxide, magnesium hydroxide, yttrium hydroxide, and titanium hydroxide. In the dispersion of the present invention, in particular, it is preferable to use silicon carbide particles coated with a layer containing aluminum hydroxide (aluminum hydroxide coated silicon carbide particles), from viewpoint of improving the dispersibility of the silicon carbide particles in an acidic condition and of improving the stability in an acidic region. That is, in the dispersion of the present invention, it is preferable that the silicon carbide particles are subjected to charge control by aluminum hydroxide coating.

(Aluminum Hydroxide Coated Silicon Carbide Particles)

Herein, the aluminum hydroxide coated silicon carbide particles are coated particles including silicon carbide particles and a coating layer containing aluminum hydroxide that covers the silicon carbide particles. Here, the aluminum hydroxide coated silicon carbide particles may be particles in which at least a part of the silicon carbide particles is coated with the coating layer containing aluminum hydroxide.

Even in a case where the aluminum hydroxide coated silicon carbide particles are cleaned with a solvent (preferably water) or in a state in which the aluminum hydroxide coated silicon carbide particles are dispersed in water, it is preferable that the form of the aluminum hydroxide coated silicon carbide particles can be maintained.

(Average Secondary Particle Size of Aluminum Hydroxide Coated Silicon Carbide Particles)

It is preferable that an average secondary particle size of the aluminum hydroxide coated silicon carbide particles is less than or equal to 2 μm. According to such a range, it is possible to further improve the dispersibility at the time of dispersing the aluminum hydroxide coated silicon carbide particles in water that is a dispersing medium. Particles having a small average secondary particle size originally have a small degree of aggregation and a small variation in a particle size. In addition, the aggregability of the particles decreases as the particle size is smaller. Therefore, in a case where aluminum hydroxide coated silicon carbide particles having an average secondary particle size of less than or equal to 2 μm are dispersed in water, it is possible to obtain a dispersion having higher dispersibility. In particular, in a case where the coating layer is formed by the following method, it is possible to attain higher dispersibility at the time of dispersing the aluminum hydroxide coated silicon carbide particles in water by combining both of an effect of reducing the aggregation in the stage of forming the coating layer and an effect of reducing the aggregation as the particles. From the same viewpoint, the average secondary particle size of the aluminum hydroxide coated silicon carbide particles is preferably less than or equal to 1.5 μm, is more preferably less than or equal to 1.0 μm, and is even more preferably less than or equal to 0.5 μm. In addition, the average secondary particle size of the aluminum hydroxide coated silicon carbide particles is not particularly limited, but is preferably greater than or equal to 0.03 μm. It is difficult to directly measure an average film thickness of the coating layer, but the coating layer is considered to be extremely thin, and thus, the average secondary particle size of the aluminum hydroxide coated silicon carbide particles mentioned above corresponds to a preferred average secondary particle size of the silicon carbide particles. From the same viewpoint, the average secondary particle size of the aluminum hydroxide coated silicon carbide particles is more preferably greater than 0.03 μm, is even more preferably greater than or equal to 0.05 μm, is still even more preferably greater than 0.05 μm, is particularly preferably greater than or equal to 0.1 μm, and is most preferably greater than 0.1 μm. Here, the value of the average secondary particle size of the aluminum hydroxide coated silicon carbide particles can be measured by a scattering particle size distribution measurement apparatus LA-950 manufactured by HORIBA, Ltd., in a dispersion in which the aluminum hydroxide coated silicon carbide particles are dispersed in a dispersing medium to have an appropriate concentration for measurement. Note that, the details of a measurement method will be described in Examples.

Note that, even in the case of using the coated particles other than the aluminum hydroxide coated silicon carbide particles, in which the layer of other charge control components is formed on the surface of silicon carbide particles, as the silicon carbide particles subjected to charge control, it is preferable that the average secondary particle size is in the range described above.

(Ratio of Average Secondary Particle Size of Aluminum Hydroxide Coated Silicon Carbide Particles to Average Secondary Particle Size of Silicon Carbide Particles)

A ratio of the average secondary particle size of the aluminum hydroxide coated silicon carbide particles (particles after coating) to the average secondary particle size of the silicon carbide particles (particles before coating) (hereinafter, also referred to as a ratio of the average secondary particle size to the silicon carbide particles) is not particularly limited, but is preferably less than or equal to 10. According to such a range, the aluminum hydroxide coated silicon carbide particles are generated while high dispersibility of the silicon carbide particles is maintained at a high level. Accordingly, a dispersion having higher dispersibility can be obtained at the time of dispersing the aluminum hydroxide coated silicon carbide particles in water. From the same viewpoint, the ratio of the average secondary particle size to the silicon carbide particles is more preferably less than or equal to 5, is even more preferably less than or equal to 3, is still even more preferably less than or equal to 2, is further even more preferably less than or equal to 1.6, and is particularly preferably less than or equal to 1.2. In addition, the ratio of the average secondary particle size to the silicon carbide particles is not particularly limited, but is preferably greater than 1. The aluminum hydroxide coated silicon carbide particles are formed by coating the surface of the silicon carbide particles with the coating layer containing aluminum hydroxide. Accordingly, in the manufacturing of the aluminum hydroxide coated silicon carbide particles, in the case of not performing a further operation for crushing secondary particles of the silicon carbide particles, the range described is set. However, the operation for crushing the secondary particles of the silicon carbide particles may be performed, or the ratio of the average secondary particle size to the silicon carbide particles may be less than or equal to 1 (a lower limit is greater than 0) regardless of whether or not the operation is included. Here, the average secondary particle sizes of the aluminum hydroxide coated silicon carbide particles and the silicon carbide particles can be obtained by the method described above.

Note that, even in the case of using coated particles other than the aluminum hydroxide coated silicon carbide particles, in which a layer of other charge control components is formed on the surface of the silicon carbide particles, as the silicon carbide particles subjected to charge control, it is preferable that the ratio of the average secondary particle size to the silicon carbide particles is in the range described above.

(Ratio of Average Secondary Particle Size of Aluminum Hydroxide Coated Silicon Carbide Particles to Average Primary Particle Size of Silicon Carbide Particles)

A ratio of the average secondary particle size of the aluminum hydroxide coated silicon carbide particles (the particles after coating) to the average primary particle size of the silicon carbide particles (the particles before coating) (also referred to as a ratio of the average secondary particle size to the average primary particle size of the silicon carbide particles) is not particularly limited, but is preferably less than or equal to 50. According to such a range, it is possible to obtain a dispersion having high dispersibility when the aluminum hydroxide coated silicon carbide particles are dispersed in water. From the same viewpoint, the ratio of the average secondary particle size to the average primary particle size of the silicon carbide particles is more preferably less than or equal to 20, is even more preferably less than or equal to 10, is still even more preferably less than or equal to 9, and is particularly preferably less than or equal to 7. In addition, the ratio of the average secondary particle size to the silicon carbide particles is generally greater than 1. This is because the aluminum hydroxide coated silicon carbide particles are formed by coating the surface of the silicon carbide particles with the coating layer containing aluminum hydroxide. In addition, the ratio of the average secondary particle size to the average primary particle size of the silicon carbide particles is preferably greater than or equal to 3, and is more preferably greater than or equal to 5, from the viewpoint of a production efficiency considering the aggregability of the silicon carbide particles.

Note that, even in the case of using the coated particles other than the aluminum hydroxide coated silicon carbide particles, in which the layer of other charge control components is formed on the surface of the silicon carbide particles, as the silicon carbide particles subjected to charge control, it is preferable that the ratio of the average secondary particle size to the average primary particle size of the silicon carbide particles is in the range described above.

<Manufacturing Method of Coated Silicon Carbide Particles Including Coating Layer Containing Charge Control Component>

In one embodiment, a manufacturing method of the coated silicon carbide particles including the coating layer containing a charge control component includes a preparing step for a water dispersion containing silicon carbide particles of adding a charge control agent and an acid to a raw dispersion containing silicon carbide particles such that the pH is in a range of greater than or equal to 9.0 and less than or equal to 12.0, thereby forming the coated silicon carbide particles including the coating layer containing a charge control component on a surface of the silicon carbide particles to prepare the water dispersion containing silicon carbide particles.

Examples of the charge control agent include sodium aluminate, cationic polymer (preferably poly(diallyl dimethyl ammonium chloride) (PDDA)), and the like.

As described above, in the dispersion according to the present invention, it is preferable to use silicon carbide particles coated with a layer containing aluminum hydroxide (the aluminum hydroxide coated silicon carbide particles), from the viewpoint of improving the dispersibility of the silicon carbide particles in the acidic condition and of improving the stability in the acidic region. Therefore, hereinafter, a manufacturing method of the aluminum hydroxide coated silicon carbide particles will be described.

The manufacturing method of the aluminum hydroxide coated silicon carbide particles is not particularly limited, and for example, a method including step (A) of respectively preparing a raw dispersion (1) containing the silicon carbide particles, an alkali, and water, in which pH is greater than or equal to 9.0 and less than or equal to 12.0, and a raw material solution (2) containing sodium aluminate (a charge control agent) and water, and step (B) of adding the raw material solution (2) and an acid to the raw dispersion (1) such that pH is maintained in a range of greater than or equal to 9.0 and less than or equal to 12.0, thereby forming coated particles including a coating layer containing aluminum hydroxide (a charge control component) on a surface of the silicon carbide particles is used.

Here, the aluminum hydroxide coated silicon carbide particles to be manufactured may be manufactured in a state of being dispersed in a dispersing medium, or may be manufactured through the subsequent step of removing the dispersing medium. The aluminum hydroxide coated silicon carbide particles manufactured in a state of being dispersed in water (the dispersing medium) can be used as the water dispersion containing silicon carbide particles in the mixing step described below.

(Step (A))

Step (A) is a step of respectively preparing the raw dispersion (1) containing the silicon carbide particles, an alkali, and water, in which the pH is greater than or equal to 9.0 and less than or equal to 12.0, and the raw material solution (2) containing sodium aluminate and water.

A preparation method of the raw dispersion (1) is not particularly limited, and examples of the preparation method include a method of adding an alkali to a water-based dispersion (a dispersion containing water as a dispersing medium, preferably, a water dispersion) of the silicon carbide particles, and the like.

The water-based dispersion of the silicon carbide particles may be a commercially available product, or may be a synthetic product. In a case where the water-based dispersion of the silicon carbide particles is synthesized (prepared), a known apparatus and a known method can be used, but there is no particular limitation.

The content of the silicon carbide particles in the water-based dispersion of the silicon carbide particles is not particularly limited, but is preferably greater than or equal to 8 mass %, and is more preferably greater than or equal to 10 mass %, with respect to a total mass of the water-based dispersion, from the viewpoint of the productivity. In addition, the content of the silicon carbide particles is preferably less than or equal to 50 mass %, and is more preferably less than or equal to 30 mass %, with respect to the total mass of the water-based dispersion, from the viewpoint of the dispersibility.

In the preparation method of the raw dispersion (1), a use amount of an alkali is not particularly limited, and the use amount may be adjusted such that the pH of the dispersion is in a predetermined range of greater than or equal to 9.0 and less than or equal to 12.0.

Examples of the alkali to be used include ammonia, potassium hydroxide, sodium hydroxide, ammonium hydrogen carbonate, ammonium carbonate, potassium hydrogen carbonate, potassium carbonate, sodium hydrogen carbonate, sodium carbonate, tetramethyl ammonium hydroxide, tetraethyl ammonium hydroxide, tetrabutyl ammonium hydroxide, methyl amine, dimethyl amine, trimethyl amine, ethyl amine, diethyl amine, triethyl amine, ethylene diamine, monoethanol amine, N-(β-aminoethyl) ethanol amine, hexamethylene diamine, diethylene triamine, triethylene tetramine, anhydrous piperazine, a piperazine hexahydrate, 1-(2-aminoethyl) piperazine, N-methyl piperazine, guanidine, imidazole, triazole, and the like. Such an alkali can be used singly, or two or more types thereof can be used by being mixed.

Here, the silicon carbide particles are not particularly limited, but it is preferable to maintain a state in which the silicon carbide particles are dispersed in the dispersing medium, from the generating of the silicon carbide particles to the preparing of the raw dispersion (1) in step (A). Then, it is more preferable to maintain the state in which the silicon carbide particles are dispersed in the dispersing medium, from the generating of the silicon carbide particles to the coating with the coating layer in step (B) described below. The state in which the silicon carbide particles are dispersed in the dispersion is maintained from the generating of the silicon carbide particles to the coating with the coating layer, and thus, it is possible to avoid the aggregation of the silicon carbide particles due to drying. Accordingly, a high level of dispersibility of the silicon carbide particles at a time point of being generated is maintained even in the state of the aluminum hydroxide coated silicon carbide particles. For this reason, it is possible to obtain a dispersion having extremely high dispersibility at the time of dispersing the aluminum hydroxide coated silicon carbide particles to be manufactured in water.

It is preferable that the raw dispersion (1) contains water as the dispersing medium. It is preferable that water is water containing minimum impurities. For example, water is preferable in which a total content of transition metal ions is less than or equal to 100 ppb. Here, the purity of water, for example, can be increased by an operation such as the removal of impurity ions using an ion exchange resin, the removal of foreign substances using a filter, and distillation. Specifically, it is preferable to use, for example, deionized water (ion exchange water), pure water, ultrapure water, distilled water, and the like, as water.

A procedure and a method of dispersing the silicon carbide particles in water, and a procedure and a method of adding an alkali to water are not particularly limited, and a known procedure and a known method can be used.

The raw dispersion (1) may contain a dispersing medium other than water. The dispersing medium other than water may be a mixed solvent of water and an organic solvent in order to disperse or dissolve each component. In this case, preferred examples of the organic solvent to be used include acetone, acetonitrile, ethanol, methanol, isopropanol, glycerin, ethylene glycol, propylene glycol, and the like, which are a water-miscible organic solvent. In addition, the organic solvent may be used without being mixed with water, and may be mixed with water after each of the components is dispersed or dissolved. Such organic solvents can be used singly, or two or more types thereof can be used in combination.

Here, the content of water in the raw dispersion (1) is preferably greater than or equal to 50 mass %, and is more preferably greater than or equal to 70 mass %, with respect to a total mass of the raw material dispersing medium (1), from the viewpoint of allowing the coating of the silicon carbide particles with aluminum hydroxide to proceed excellently.

In the raw dispersion (1) to be obtained in this step, it is preferable that the pH is greater than or equal to 9.0 and less than or equal to 12.0. In a case where the pH is greater than or equal to 9.0, local aggregation is less likely to occur in an acid dropping site. On the other hand, in a case where the pH is less than or equal to 12.0, aluminum hydroxide single component particles are prevented from being generated. It is more preferable that the pH is greater than 9.0 and less than or equal to 12.0, from the viewpoint of improving a formation speed of the coating layer and of improving the productivity.

A preparation method of the raw material solution (2) is not particularly limited, and examples of the preparation method include a method of adding sodium aluminate to water, and the like. The content of sodium aluminate in the raw material solution (2) is not particularly limited, but is preferably greater than or equal to 10 mass % and less than or equal to 50 mass %, and is more preferably greater than or equal to 20 mass % and less than or equal to 40 mass %, with respect to a total mass of the raw material solution (2).

(Step (B))

Step (B) is a step of adding the raw material solution (2) and an acid to the raw dispersion (1) prepared in step (A) such that the pH is maintained in a range of greater than or equal to 9.0 and less than or equal to 12.0, and forming the coated particles including the coating layer containing aluminum hydroxide on a surface of the silicon carbide particles. In step (B), the aluminum hydroxide coated silicon carbide particles are manufactured.

A method of adding the raw material solution (2) and an acid to the raw dispersion (1) is not particularly limited insofar as the pH can be maintained to be greater than or equal to 9.0 and less than or equal to 12.0 (that is, unless the concentration of aluminate ions is excessive), and examples of the method include a method of simultaneously adding the raw material solution (2) and an acid, and a method of alternately and gradually adding the raw material solution (2) and an acid.

An addition amount of the raw material solution (2) is not particularly limited, but the raw material solution (2) is added such that sodium aluminate is preferably greater than or equal to 1 part by mass, is more preferably greater than or equal to 5 parts by mass, and is even more preferably greater than or equal to 10 parts by mass, with respect to 100 parts by mass of the silicon carbide particles. This is because in a case where the addition amount of the raw material solution (2) is in the range, it is possible to sufficiently cover the silicon carbide particles with aluminum hydroxide (Al(OH)$_3$), and to sufficiently exhibit a function derived from an aluminum-containing compound. In addition, the addition amount of the raw material solution (2) is not particularly limited, but the raw material solution (2) is added such that sodium aluminate is preferably less than or equal to 800 parts by mass, is more preferably less than or equal to 400 parts by mass, and is even more preferably less than or equal to 100 parts by mass, with respect to 100 parts by mass of the silicon carbide particles. This is because in a case where coating proceeds to some extent, an effect to be obtained by the coating becomes constant, and thus, an economic efficiency and a production efficiency are improved by setting the addition amount of the raw material solution (2) to be less than or equal to a predetermined amount. In one embodiment of the present invention, a use amount of sodium aluminate is 1 part by mass to 100 parts by mass with respect to 100 parts by mass of the silicon carbide particles.

The acid is not particularly limited, and examples of the acid include an inorganic acid such as a nitric acid, a sulfuric acid, a phosphoric acid, and a hydrochloric acid (in particular, an inorganic strong acid such as a nitric acid, a sulfuric acid, and a hydrochloric acid), an organic acid such as an acetic acid, a citric acid, a lactic acid, an oxalic acid, and a phthalic acid, and the like. Among them, an inorganic strong acid is preferable, and a nitric acid, a sulfuric acid, and a hydrochloric acid are more preferable, from the viewpoint that it is possible to attain an object with a less addition amount and to easily obtain a high-purity product having a low possibility of being mixed with other elements.

Here, it is preferable that the acid described above is added in the form of an aqueous solution, and the concentration of the acid in the aqueous solution is not particularly limited, but is preferably greater than or equal to 1.0 mass %. This is because in a case where the concentration of the acid is in the range, the addition amount decreases, and the productivity increases. From the same viewpoint, the concentration of the acid in the aqueous solution is more preferably greater than or equal to 1.5 mass %, and is even more preferably greater than or equal to 2.0 mass %. In addition, the concentration of the acid in the aqueous solution is not particularly limited, but is preferably less than or equal to 30 mass %. This is because in a case where the concentration of the acid in the aqueous solution is in the range, corrosiveness decreases, and a facility load decreases. From the same viewpoint, the concentration of the acid in the aqueous solution is more preferably less than or equal to 20 mass %, is even more preferably less than or equal to 15 mass %, and is still even more preferably less than or equal to 10 mass %.

In addition, a speed for adding the raw material solution (2) and an acid (an addition speed) is not particularly limited, and may be suitably adjusted such that the pH is in the range of greater than or equal to 9.0 and less than or equal to 12.0, and the subsequent pH is easily maintained.

In addition, this step includes a stage of forming the coated particles including the coating layer containing aluminum hydroxide on the surface of the silicon carbide particles by setting the pH to be in the range of greater than or equal to 9.0 and less than or equal to 12.0.

In this stage, it is preferable that a maintaining time for a state in which the pH is in the range of greater than or equal to 9.0 and less than or equal to 12.0 is longer than or equal to 1 minute. This is because in a case where maintaining time is in the range, it is possible to more sufficiently cover the silicon carbide particles with aluminum hydroxide and to further improve the function that is derived from the aluminum-containing compound of the aluminum hydroxide coated silicon carbide particles. In addition, in the manufacturing of the dispersion for a silicon carbide sintered body, in a case where the aluminum hydroxide coated silicon carbide particles and the boron nitride particles are dispersed in water, the aggregation in the dispersion is less likely to occur, and a dispersion having high dispersibility can be obtained. From the same viewpoint, the maintaining time is preferably longer than or equal to 30 minutes, is more preferably longer than or equal to 50 minutes, and is even more preferably longer than or equal to 60 minutes. In addition, it is preferable that the maintaining time in this stage is shorter than or equal to 200 minutes. This is because in a case where coating proceeds to some extent, an effect to be obtained by the coating becomes constant, and thus, in a case where the maintaining time is in such a range, the economic efficiency and the production efficiency are further improved. From the same viewpoint, the maintaining time is preferably shorter than or equal to 150 minutes, and is more preferably shorter than or equal to 120 minutes.

It is preferable that the pH in this stage is greater than or equal to 9.0 and less than or equal to 12.0. In a case where the pH is greater than or equal to 9.0, the aggregation of the silicon carbide particles is less likely to occur, and homogeneous dispersibility is easily maintained. It is preferable that the pH is less than or equal to 12.0 since it is possible to prevent more aluminum hydroxide particles from being formed.

It is possible to obtain a dispersion containing the aluminum hydroxide coated silicon carbide particles and the dispersing medium through step (B). That is, the aluminum hydroxide coated silicon carbide particles can be manufactured in a state of being dispersed in the dispersing medium.

(Other Steps)

In the manufacturing method of the aluminum hydroxide coated silicon carbide particles, other steps in addition to step (A) and step (B) may be further included, and in step (A) and step (B), stages according to other operations may be further included.

Note that, it may be difficult to directly measure a film thickness of the coating layer due to a change in an existence state of the particles according to coating, but in general, the pH at an isoelectric point of a zeta potential tends to increase as the film thickness of the coating layer increases. Accordingly, it is possible to judge that a preferred film thickness of the coating layer is obtained from the fact that a value of the pH at an isoelectric point of the aluminum hydroxide coated silicon carbide particles is in a preferred range.

In addition, it is possible to confirm that the coating layer contains aluminum hydroxide by performing SEM (Scanning Electron Microscope)-EDX (Energy Dispersive X-ray Spectroscopy) observation and EELS (Electron Energy Loss Spectroscopy) analysis on the aluminum hydroxide coated silicon carbide particles.

<Isoelectric Point of Silicon Carbide Particles>

The pH at an isoelectric point of the silicon carbide particles (in the case of being subjected to charge control, the silicon carbide particles subjected to charge control) is not particularly limited, but is preferably greater than or equal to 4.5. In a case where the pH at the isoelectric point is in the range, the aggregation in the dispersing medium is less likely to occur, and excellent dispersibility is maintained even in the case of using the silicon carbide particles and the boron nitride particles together in the dispersion containing the dispersing medium. Accordingly, it is possible to obtain a dispersion having higher dispersibility at the time of dispersing the silicon carbide particles and other particles in the medium. From the same viewpoint, the pH at the isoelectric point of the silicon carbide particles is more preferably greater than or equal to 5, is even more preferably greater than or equal to 5.5, and is particularly preferably greater than or equal to 6. In addition, the pH at the isoelectric point of the silicon carbide particles is not particularly limited, but is preferably less than or equal to 9, from the same viewpoint. Accordingly, the pH at the isoelectric point of the silicon carbide particles according to a preferred aspect of the present invention, for example, is greater than or equal to 4.5 and less than or equal to 9.

A zeta potential measurement liquid of the pH with 1.0 increments, for example, the pH with 1.0 increments in a range of 3.0 to 10.0, is prepared, a zeta potential is measured, and the pH at the isoelectric point can be calculated by the following equation from the pH before and after the sign of the zeta potential is changed and the zeta potential at the pH before and after the sign of the zeta potential is changed.

$$\text{pH at Isoelectric Point} = \frac{\alpha \times \zeta_\beta - \beta \times \zeta_\alpha}{\zeta_\beta - \zeta_\alpha} \qquad \text{[Mathematical Formula 1]}$$

$\alpha$ and $\beta$: value of pH before and after Sign of Zeta Potential is Changed ($\alpha < \beta$)

$\zeta_\alpha$: Zeta Potential at Value $\alpha$ of pH $\zeta_\beta$: Zeta Potential at Value $\beta$ of pH Here, the pH can be measured by a pH meter (Model Number: F-71) manufactured by HORIBA, Ltd. In addition, the zeta potential can be measured by a zeta potential measurement apparatus (Product Name "Zetasizer nano ZSP") manufactured by Malvern Instruments Limited. Note that, the details of a measurement method will be described in Examples.

<Zeta Potential of Silicon Carbide Particles in Dispersion for Silicon Carbide Sintered Body>

A zeta potential of the silicon carbide particles (in the case of being subjected to charge control, the silicon carbide particles subjected to charge control) in the dispersion for a silicon carbide sintered body is not particularly limited insofar as the zeta potential has the same sign as that of boron nitride particles, but the absolute value is preferably greater than or equal to 10 mV, and is more preferably greater than or equal to +10 mV, from the viewpoint of improving the dispersibility. An upper limit value of the zeta potential of the silicon carbide particles in the dispersion for a silicon carbide sintered body is not particularly limited, but substantially, the absolute value is less than or equal to 50 mV, and for example, is less than or equal to +50 mV.

<Content of Silicon Carbide Particles in Dispersion for Silicon Carbide Sintered Body>

A lower limit of the content of the silicon carbide particles (in the case of being subjected to charge control, the silicon carbide particles subjected to charge control) in the dispersion for a silicon carbide sintered body according to the present invention is preferably greater than or equal to 0.1 mass %, is more preferably greater than or equal to 0.5 mass %, is even more preferably greater than or equal to 1 mass %, and is most preferably greater than or equal to 5 mass %. In addition, an upper limit of the content of the silicon carbide particles in the dispersion for a silicon carbide sintered body is preferably less than or equal to 55 mass %, is more preferably less than or equal to 45 mass %, is even more preferably less than or equal to 35 mass %, and is most preferably less than or equal to 25 mass %. According to such a range, the stability and the handleability of the dispersion are improved. In addition, it is possible to obtain a high quality silicon carbide sintered body.

<Boron Nitride (BN) Particles>

Boron nitride (BN) is a hard material, and thus, it has been expected to improve thermal shock resistance and mechanical workability of a sintered body containing silicon carbide by combining boron nitride (BN) particles with silicon carbide particles.

A crystalline structure of boron nitride is not particularly limited, and any of hexagonal boron nitride and cubic boron nitride can be adopted, but hexagonal boron nitride is preferably used from the viewpoint of easy manufacturing.

An average primary particle size of the boron nitride particles is not particularly limited, but is preferably less than or equal to 9 μm. In a case where the average primary particle size is in the range, it is possible to obtain a dispersion having higher dispersibility. From the same viewpoint, the average primary particle size of the silicon carbide particles is more preferably less than or equal to 7 μm, and is even more preferably less than or equal to 6 μm. In addition, the average primary particle size of the boron nitride particles is not particularly limited, but is preferably greater than or equal to 10 nm. In a case where the average primary particle size is in the range, it is possible to further improve the function of the boron nitride particles. From the same viewpoint, the average primary particle size of the boron nitride particles is more preferably greater than or equal to 50 nm, and is even more preferably greater than or equal to 100 nm. Here, the value of the average primary particle size of the boron nitride particles can be calculated on the basis of an average value a specific surface area (SA) of the boron nitride particles that is calculated from a value consecutively measured three to five times by a BET method, by using the value of a true density of the boron nitride particles, and by assuming that the shape of the boron nitride particles as a true sphere. The specific surface area of the boron nitride particles, for example, can be measured by using Flow SorbII 2300 manufactured by Micromeritics Instrument Corporation.

It is preferable that an average secondary particle size of the boron nitride particles is less than 20 μm. In a case where the average secondary particle size is in the range, it is possible to obtain a dispersion having higher dispersibility. From the same viewpoint, the average secondary particle size of the boron nitride particles is more preferably less than or equal to 19 μm, is even more preferably less than or equal to 18 μm, is still even more preferably less than 15 μm, is particularly preferably less than 10 μm, and is most preferably less than 5 μm. In addition, it is preferable that the average secondary particle size of the boron nitride particles is greater than or equal to 0.3 μm. In a case where the average secondary particle size is in the range, it is possible to perform charge control by coating with the coating layer with a high efficiency. From the same viewpoint, the average secondary particle size of the boron nitride particles is more preferably greater than or equal to 0.5 μm, and is even more preferably greater than or equal to 1 μm. Here, the value of the average secondary particle size of the boron nitride particles can be measured by a scattering particle size distribution measurement apparatus LA-950 manufactured by HORIBA, Ltd. Note that, the details of a measurement method will be described in Examples.

In addition, a commercially available product may be used, or a synthetic product may be used, as the boron nitride particles. The commercially available product is not particularly limited, and for example, AP-10S, AP-100S, and AP-170S manufactured by MARUKA CORPORATION LTD., UHP-1K manufactured by Showa Denko K.K., and the like can be used.

The boron nitride particles may be used singly or may be used as a composite thereof, or two or more types thereof may be used by being mixed.

<Water Dispersion Containing Boron Nitride Particles>

A manufacturing method of the water dispersion containing boron nitride particles, that is, a procedure and a method for dispersing the boron nitride particles in the dispersing medium containing water are not particularly limited, and a known procedure and a known method of the related art can be used.

It is preferable that water that is used in the manufacturing method of the water dispersion containing boron nitride particles is water containing minimum impurities. For example, water is preferable in which a total content of transition metal ions is less than or equal to 100 ppb. Here, the purity of water, for example, can be increased by an operation such as the removal of impurity ions using an ion exchange resin, the removal of foreign substances using a filter, and distillation. Specifically, it is preferable to use, for example, deionized water (ion exchange water), pure water, ultrapure water, distilled water, and the like, as water.

In addition, it is possible to use a water dispersion containing coated boron nitride particles that are obtained by a manufacturing method of boron nitride particles on which a functional polymer described below is adsorbed.

The water dispersion containing boron nitride particles is capable of containing a dispersing medium other than water, as described below. The dispersing medium is preferably only water, from the viewpoint of a small environmental load.

<Charge Control of Boron Nitride Particles>

Boron nitride particles subjected to charge control or boron nitride particles not subjected to charge control can be used without any limitation insofar as the boron nitride particles have charges (zeta potentials) of the same sign as that of the silicon carbide particles. In the dispersion of the present invention, it is preferable to use the boron nitride particles subjected to charge control in order to have surface charges of the same sign as that of the silicon carbide particles or to further increase repulsion with the silicon carbide particles even in the case of having the same sign as that of the silicon carbide particles. The charge control of the boron nitride particles is not particularly limited, but a method of adjusting a surface charge by forming a layer of other components on the surface of the boron nitride particles is exemplified.

Specifically, for example, it is possible to adjust the surface charge by adsorbing a functional polymer having a function of adjusting the surface charge on the surface of the boron nitride particles. In the dispersion of the present invention, the dispersibility and the stability are improved by adjusting the zeta potential to have the same sign as that of the silicon carbide particles in a condition in which the pH at 25° C. is less than or equal to 7.0, and thus, it is preferable to adsorb a cationic polymer as the functional polymer. That is, in the dispersion of the present invention, it is preferable that the boron nitride particles are subjected to charge control by a cationic polymer.

The cationic polymer is not particularly limited insofar as the cationic polymer is charged positively in a predetermined dispersing medium, and a known polymer of the related art can be used. For example, poly(diallyl dimethyl ammonium chloride) (PDDA), poly(methacryloyloxyethyl trimethyl ammonium chloride), poly(acryl amide-co-diallyl dimethyl ammonium chloride), poly(dimethyl amine-co-epichlorohydrin-co-ethylene diamine), polyethylene imine, ethoxylated polyethylene imine, poly(amidoamine), poly (methacryloyloxyethyl dimethyl ammonium chloride), poly (vinyl pyrrolidone), poly(vinyl imidazole), poly(vinyl pyridine), poly(vinyl amine), polyallyl amine and quaternary amine thereof, a polyallyl amine hydrochloride (PAH), polylysine, polyacryl amide, polypyrrole, polyaniline, a copolymer containing at least one type thereof or a polymer in which the type of salt is changed, and the like can be used.

Poly(diallyl dimethyl ammonium chloride), poly(methacryloyloxyethyl trimethyl ammonium chloride), poly(acryl amide-co-diallyl dimethyl ammonium chloride), poly(dimethyl amine-co-epichlorohydrin-co-ethylene diamine), polyethylene imine, ethoxylatedpolyethylene imine, poly(amidoamine), poly(methacryloyloxyethyl dimethyl ammonium chloride), poly(vinyl pyrrolidone), poly(vinyl imidazole), poly(vinyl pyridine), or poly(vinyl amine) is preferably used as the cationic polymer.

A molecular weight of the cationic polymer is not particularly limited, and for example, it is preferable that a weight average molecular weight is 20,000 to 200,000. According to the range described above, the effects of the present invention can be particularly remarkably obtained. Note that, herein, a value measured by a gel permeation chromatography (GPC) is adopted as the value of the "weight average molecular weight".

(Cationic Polymer Coated Boron Nitride Particles)

Herein, cationic polymer coated boron nitride particles are coated particles including boron nitride particles and a coating layer containing a cationic polymer that covers the boron nitride particles. Here, the cationic polymer coated boron nitride particles may be particles in which at least a part of the boron nitride particles is coated with the coating layer containing a cationic polymer.

Even in a case where the cationic polymer coated boron nitride particles are cleaned with a solvent (preferably water) or in a state in which the boron nitride particles are dispersed in water, it is preferable that the form as the cationic polymer coated boron nitride particles can be maintained.

(Average Secondary Particle Size of Cationic Polymer Coated Boron Nitride Particles)

It is preferable that an average secondary particle size of the cationic polymer coated boron nitride particles is less than or equal to 20 µm. According to such a range, it is possible to further improve the dispersibility at the time of dispersing the cationic polymer coated boron nitride particles in water that is the dispersing medium. Particles having a small average secondary particle size originally have a small degree of aggregation and a small variation in a particle size. In addition, the aggregability of the particles decreases as the particle size is small. Therefore, in a case where cationic polymer coated boron nitride particles having an average secondary particle size of less than or equal to 20 µm are dispersed in water, it is possible to obtain a dispersion having higher dispersibility. From the same viewpoint, the average secondary particle size of the cationic polymer coated boron nitride particles is more preferably less than or equal to 15 µm, is even more preferably less than or equal to 10 µm, and is particularly preferably less than or equal to 5 µm. In addition, the average secondary particle size of the cationic polymer coated boron nitride particles is not particularly limited, but is preferably greater than or equal to 0.3 µm. It is difficult to directly measure an average film thickness of the coating layer, but the coating layer is considered to be extremely thin, and thus, the average secondary particle size of the cationic polymer coated boron nitride particles mentioned above corresponds to a preferred average secondary particle size of the boron nitride particles. From the same viewpoint, the average secondary particle size of the cationic polymer coated boron nitride particles is more preferably greater than 0.3 µm, is even more preferably greater than or equal to 0.5 µm, is still even more preferably greater than 0.5 µm, is particularly preferably greater than or equal to 1 µm, and is most preferably greater than 1 µm. Here, the value of the average secondary particle size of the cationic polymer coated boron nitride particles can be measured by a scattering particle size distribution measurement apparatus LA-950 manufactured by HORIBA, Ltd., in a dispersion in which the cationic polymer coated boron nitride particles are dispersed in a dispersing medium to have an appropriate concentration for measurement. Note that, the details of a measurement method will be described in Examples.

Note that, even in the case of using coated particles other than the cationic polymer coated boron nitride particles, in which the layer of the other components is formed on the surface of the boron nitride particles, as the boron nitride particles subjected to charge control, it is preferable that the average secondary particle size is in the range described above.

(Ratio of Average Secondary Particle Size of Cationic Polymer Coated Boron Nitride Particles to Average Secondary Particle Size of Boron Nitride Particles)

A ratio of the average secondary particle size of the cationic polymer coated boron nitride particles (particles after coating) to the average secondary particle size of the boron nitride particles (particles before coating) (hereinafter, also referred to as a ratio of the average secondary particle size to the boron nitride particles) is not particularly limited, but is preferably less than or equal to 10. According to such a range, the cationic polymer coated boron nitride particles are generated while high dispersibility of the boron nitride particles is maintained at a high level. Accordingly, a dispersion having higher dispersibility can be obtained at the time of dispersing the cationic polymer coated boron nitride particles in water. From the same viewpoint, the ratio of the average secondary particle size to the boron nitride particles is more preferably less than or equal to 5, is even more preferably less than or equal to 3, is still even more preferably less than or equal to 2, is further even more preferably less than or equal to 1.6, and is particularly preferably less than or equal to 1.2. In addition, the ratio of the average secondary particle size to the boron nitride particles is not particularly limited, but is preferably greater than or equal to 0.9.

Note that, even in the case of using the coated particles other than the cationic polymer coated boron nitride particles, in which the layer of the other components is formed on the surface of the boron nitride particles, as the boron nitride particles subjected to the charge control, it is preferable that the ratio of the average secondary particle size to the boron nitride particles is in the range described above.

<Manufacturing Method of Boron Nitride Particles on which Functional Polymer is Adsorbed>

In one embodiment, a manufacturing method of the boron nitride particles on which a functional polymer is adsorbed includes a preparing step for a water dispersion containing boron nitride particles of adding a solution containing a functional polymer to a raw dispersion containing boron nitride particles, thereby forming the coated boron nitride particles including the coating layer containing the functional polymer on a surface of the boron nitride particles to prepare the water dispersion containing boron nitride particles.

As described above, in the dispersion according to the present invention, the silicon carbide particles and the boron nitride particles have charges (zeta potentials) of the same sign in a condition in which the pH at 25° C. is less than or equal to 7.0, and thus, the dispersibility and the stability are improved. Accordingly, it is preferable that a cationic polymer is adsorbed on the boron nitride particles as the functional polymer. Therefore, hereinafter, a manufacturing method of boron nitride particles on which a cationic polymer is adsorbed will be described.

The boron nitride particles on which the cationic polymer is adsorbed (the cationic polymer coated boron nitride particles) are not particularly limited, and for example, a method including step (A) of respectively preparing a raw dispersion (1) containing the boron nitride particles and water, and a raw material solution (2) containing a cationic polymer and water, and step (B) of adding and mixing the raw material solution (2) to the raw dispersion (1), thereby forming coated particles including a coating layer containing a cationic polymer on the surface of the boron nitride particles is used.

Here, the cationic polymer coated boron nitride particles to be manufactured may be manufactured in a state of being dispersed in water, or may be manufactured through the subsequent step of removing water. The cationic polymer coated boron nitride particles manufactured in a state of being dispersed in water can be used as the water dispersion containing boron nitride particles in the mixing step described below.

(Step (A))

Step (A) is a step of respectively preparing the raw dispersion (1) containing the boron nitride particles and water, and the raw material solution (2) containing the cationic polymer and water.

A preparation method of the raw dispersion (1) containing the boron nitride particles and water is not particularly limited. A commercially available product may be used, or a synthetic product may be used. In a case where the raw dispersion (1) containing the boron nitride particles and water is synthesized (prepared), a known apparatus and a known method can be used, but there is no particular limitation.

The content of the boron nitride particles in the raw dispersion (1) is not particularly limited, but is preferably greater than or equal to 8 mass %, and is more preferably greater than or equal to 10 mass %, with respect to a total mass of the raw dispersion (1), from the viewpoint of the productivity. In addition, the content of the boron nitride particles is preferably less than or equal to 50 mass %, and is more preferably less than or equal to 30 mass %, with respect to the total mass of the raw dispersion (1), from the viewpoint of the dispersibility.

Here, the boron nitride particles are not particularly limited, but it is preferable to maintain a state in which the silicon carbide particles are dispersed in the dispersing medium, from the generating of the boron nitride particles to the preparing of the raw dispersion (1) in step (A). Then, it is more preferable to maintain the state in which the boron nitride particles are dispersed in the dispersing medium, from the generating of the boron nitride particles to the coating with the coating layer in step (B) described below. The state in which the boron nitride particles are dispersed in the dispersion is maintained from the generating of the boron nitride particles to the coating with the coating layer, and thus, it is possible to avoid the aggregation of the boron nitride particles due to drying. Accordingly, a high level of dispersibility of the boron nitride particles at a time point of being generated is maintained even in the state of the cationic polymer coated boron nitride particles. For this reason, it is possible to obtain a dispersion having extremely high dispersibility at the time of dispersing the cationic polymer coated boron nitride particles to be manufactured in water.

It is preferable that the raw dispersion (1) contains water as the dispersing medium. It is preferable that water is water containing minimum impurities. For example, water is preferable in which a total content of transition metal ions is less than or equal to 100 ppb. Here, the purity of water, for example, can be increased by an operation such as the removal of impurity ions using an ion exchange resin, the removal of foreign substances using a filter, and distillation. Specifically, it is preferable to use, for example, deionized water (ion exchange water), pure water, ultrapure water, distilled water, and the like, as water.

A procedure and a method of dispersing the boron nitride particles in water are not particularly limited, and a known procedure and a known method can be used.

The raw dispersion (1) may contain a dispersing medium other than water. The dispersing medium other than water may be a mixed solvent of water and an organic solvent in order to disperse or dissolve each component. In this case, preferred examples of the organic solvent to be used include acetone, acetonitrile, ethanol, methanol, isopropanol, glycerin, ethylene glycol, propylene glycol, and the like, which are a water-miscible organic solvent. In addition, the organic solvent may be used without being mixed with water, and may be mixed with water after each of the components is dispersed or dissolved. Such organic solvents can be used singly, or two or more types thereof can be used in combination.

Here, the content of water in the raw dispersion (1) is preferably greater than or equal to 50 mass %, and is more preferably greater than or equal to 70 mass %, with respect to a total mass of the raw material dispersing medium (1), from the viewpoint of allowing the coating of the boron nitride particles with the cationic polymer to proceed more excellently.

The raw dispersion (1) to be obtained in this step is not particularly limited, but it is preferable that the pH is greater than or equal to 5.0, from the viewpoint of suppressing electrostatic aggregation.

A preparation method of the raw material solution (2) is not particularly limited, and examples of the preparation method include a method of adding the cationic polymer to water, and the like. The content of the cationic polymer in the raw material solution (2) is not particularly limited, but is preferably greater than or equal to 10 mass % and less than or equal to 50 mass %, and is more preferably greater than or equal to 20 mass % and less than or equal to 40 mass %, with respect to a total mass of the raw material solution (2).

(Step (B))

Step (B) is a step of adding the raw material solution (2) and an acid to the raw dispersion (1) prepared in step (A), thereby forming the coated particles including the coating layer containing the cationic polymer on the surface of the boron nitride particles. In step (B), the cationic polymer coated boron nitride particles in which the cationic polymer is adsorbed on the surface of the boron nitride particles are manufactured.

A method of adding the raw material solution (2) to the raw dispersion (1) is not particularly limited, and for example, the raw material solution (2) may be added at one time, or the raw material solution (2) may be gradually added.

An addition amount of the raw material solution (2) is not particularly limited, but the raw material solution (2) is added such that the cationic polymer is preferably greater than or equal to 0.1 parts by mass, is more preferably greater than or equal to 0.5 parts by mass, and is even more preferably greater than or equal to 1 part by mass, with respect to 100 parts by mass of the boron nitride particles. This is because in a case where the addition amount of the raw material solution (2) is in the range, it is possible to sufficiently cover the boron nitride particles with the cationic polymer, and to perform charge control such that a desired zeta potential can be obtained. In addition, the addition amount of the raw material solution (2) is not particularly limited, but the raw material solution (2) is added such that the cationic polymer is preferably less than or equal to 80 parts by mass, is more preferably less than or equal to 40 parts by mass, and is even more preferably less than or equal to 10 parts by mass, with respect to 100 parts by mass of the boron nitride particles. This is because in a case where coating proceeds to some extent, an effect to be obtained by the coating becomes constant, and thus, the economic efficiency and the production efficiency are improved by setting the addition amount of the raw material solution (2) to be less than or equal to a predetermined amount.

In this stage, it is preferable to add the raw material solution (2) to the raw dispersion (1), and to allow a reaction to proceed by stirring. A reaction time is not particularly limited, but is preferably longer than or equal to 1 minute. This is because in a case where the reaction time is in the range, it is possible to more sufficiently cover the boron nitride particles with the cationic polymer, and to perform charge control such that a desired zeta potential can be obtained. In addition, in the manufacturing of the dispersion for a silicon carbide sintered body, in a case where the silicon carbide particles and the cationic polymer coated boron nitride particles are dispersed in water, the aggregation in the dispersion is less likely to occur, and a dispersion having high dispersibility can be obtained. From the same viewpoint, the reaction time is preferably longer than or equal to 30 minutes, is more preferably longer than or equal to 50 minutes, and is even more preferably longer than or equal to 60 minutes. In addition, it is preferable that the reaction time in this stage is shorter than or equal to 200 minutes. This is because in a case where coating proceeds to some extent, an effect to be obtained by the coating becomes constant, and thus, in a case where the reaction time is in such a range, the economic efficiency and the production efficiency are further improved. From the same viewpoint, the reaction time is preferably shorter than or equal to 150 minutes, is more preferably shorter than or equal to 120 minutes, and is even more preferably shorter than or equal to 90 minutes.

The pH in this stage is not particularly limited, but it is preferable that the pH is 5.0 to 11.0, from the viewpoint of suppressing electrostatic repulsion with the functional polymer.

It is possible to obtain a dispersion containing the cationic polymer coated boron nitride particles and the dispersing medium through step (B). That is, it is possible to manufacture the cationic polymer coated boron nitride particles in a state of being dispersed in the dispersing medium.

(Other Steps)

In a manufacturing method of the cationic polymer coated boron nitride particles, other steps in addition to step (A) and step (B) may be further included, and in step (A) and step (B), stages according to other operations may be further included.

Note that, it is possible to confirm that the boron nitride particles are coated with the cationic polymer by measuring a zeta potential of the cationic polymer coated boron nitride particles.

<Isoelectric Point of Boron Nitride Particles>

The boron nitride particles (in the case of being subjected to charge control, the boron nitride particles subjected to charge control) are not particularly limited insofar as the boron nitride particles have charges of the same sign as that of the silicon carbide particles, but the pH at an isoelectric point is preferably greater than or equal to 5. Accordingly, in the dispersion for a silicon carbide sintered body containing the silicon carbide particles and the boron nitride particles, the aggregation is less likely to occur, and excellent dispersibility is maintained. Accordingly, it is possible to obtain a dispersion having high dispersibility. From the same viewpoint, it is more preferable that the pH at the isoelectric point of the boron nitride particles is greater than or equal to 5 and less than or equal to 11.

Here, it is preferable that the absolute value of a difference between the pH at the isoelectric point of the boron nitride particles and the pH at the isoelectric point of the silicon carbide particles is smaller, and the absolute value of the difference is preferably less than or equal to 2, is more preferably less than or equal to 1.5, and is even more preferably less than or equal to 1 (a lower limit of 0). This is because the aggregation of the particles having close pH at the isoelectric point is less likely to occur.

<Zeta Potential of Boron Nitride Particles in Dispersion for Silicon Carbide Sintered Body>

A zeta potential of the boron nitride particles (in the case of being subjected to charge control, the boron nitride particles subjected to charge control) in the dispersion for a silicon carbide sintered body is not particularly limited insofar as the zeta potential has the same sign as that of the silicon carbide particles, but the absolute value is preferably greater than or equal to 10 mV, and is more preferably greater than or equal to +10 mV, from the viewpoint of improving the dispersibility. An upper limit value of the zeta potential of the boron nitride particles in the dispersion for a silicon carbide sintered body is not particularly limited, but substantially, the absolute value is less than or equal to 50 mV, and for example, is less than or equal to +50 mV.

<Content of Boron Nitride Particles in Dispersion for Silicon Carbide Sintered Body>

A lower limit of the content of the boron nitride particles (in the case of being subjected to charge control, the boron nitride particles subjected to charge control) in the dispersion for a silicon carbide sintered body according to the present invention is preferably greater than or equal to 0.1 mass %, is more preferably greater than or equal to 0.3 mass %, is even more preferably greater than or equal to 0.5 mass %, and is most preferably greater than or equal to 1 mass %. In addition, an upper limit of the content of the boron nitride particles in the dispersion for a silicon carbide sintered body is preferably less than or equal to 50 mass %, is more preferably less than or equal to 40 mass %, is even more preferably less than or equal to 30 mass %, and is most preferably less than or equal to 20 mass %. According to such a range, the stability and the handleability of the dispersion are improved. In addition, it is possible to obtain a high quality silicon carbide sintered body.

(Resin Having Hydroxyl Group)

Polyvinyl alcohol (PVA), polyvinyl butyral (PVB), a glyoxal resin, an acrylic resin, a phenol resin, hydroxyl group-containing polyvinyl pyrrolidone (PVP), hydroxyl group-containing polyester, hydroxyl group-containing silicone, or a hydroxyl group-containing polycarboxylic acid are preferably used as the resin having a hydroxyl group, but the resin having a hydroxyl group is not limited thereto. In particular, polyvinyl alcohol (PVA) and polyvinyl butyral (PVB) are preferable from the viewpoint of the ease of handling and the ease of viscosity adjustment. The dispersion according to the present invention uses the resin having a hydroxyl group, and thus, it is possible to obtain excellent dispersibility and high temporal stability in a condition in which the pH is less than or equal to 7.0.

A molecular weight of the resin having a hydroxyl group is not particularly limited, but it is preferable that a weight average molecular weight is 500 to 500000, from the viewpoint of the ease of handling and the ease of viscosity adjustment. According to the range described above, the effects of the present invention can be particularly remarkably obtained. Note that, herein, a value measured by a gel permeation chromatography (GPC) is adopted as the value of the "weight average molecular weight".

A lower limit of the content of the resin having a hydroxyl group in the dispersion for a silicon carbide sintered body is not particularly limited, but is preferably greater than or equal to 0.1 mass %, is more preferably greater than or equal to 0.5 mass %, and is even more preferably greater than or equal to 1 mass %. In addition, an upper limit of the content of the resin having a hydroxyl group in the dispersion for a silicon carbide sintered body is preferably less than or equal to 40 mass %, is more preferably less than or equal to 30 mass %, and is even more preferably less than or equal to 20 mass %. According to such a range, the stability and the handleability of the dispersion are improved. In addition, it is possible to obtain a high quality silicon carbide sintered body.

Note that, herein, the resin having a hydroxyl group is handled as being different from the cationic polymer that is used in the charge control of the boron nitride particles.

(Aqueous Solution Containing Resin Having Hydroxyl Group)

A manufacturing method of the aqueous solution containing the resin having a hydroxyl group, that is, a procedure and a method of dissolving the resin having a hydroxyl group in a solvent containing water are not particularly limited, and a known procedure and a known method of the related art can be used.

It is preferable that water that is used in the manufacturing method of the aqueous solution containing the resin having a hydroxyl group is water containing minimum impurities. For example, water is preferable in which a total content of transition metal ions is less than or equal to 100 ppb. Here, the purity of water, for example, can be increased by an operation such as the removal of impurity ions using an ion exchange resin, the removal of foreign substances using a filter, and distillation. Specifically, it is preferable to use, for example, deionized water (ion exchange water), pure water, ultrapure water, distilled water, and the like, as water.

(Dispersing Medium/Solvent)

The water dispersion containing silicon carbide particles, the water dispersion containing boron nitride particles, and the aqueous solution containing the resin having a hydroxyl group, described above, contain water as a dispersing medium or a solvent. The dispersing medium or the solvent has a function of dispersing or dissolving each component. It is preferable that the dispersing medium or the solvent is only water. In addition, the dispersing medium or the solvent may further contain an organic solvent in order to disperse or dissolve each of the components. In this case, preferred examples of the organic solvent to be used include acetone, acetonitrile, ethanol, methanol, isopropanol, glycerin, ethylene glycol, propylene glycol, and the like, which are a water-miscible organic solvent. The dispersing medium or the solvent may be a mixture of water and the organic solvent. In addition, the organic solvent may be used without being mixed with water, and may be mixed with water after each of the components is dispersed or dissolved. Such organic solvents can be used singly, or two or more types thereof can be used in combination.

Water containing minimum impurities is preferable as water. For example, water is preferable in which a total content of transition metal ions is less than or equal to 100 ppb. Here, the purity of water, for example, can be increased by an operation such as the removal of impurity ions using an ion exchange resin, the removal of foreign substances using a filter, and distillation. Specifically, it is preferable to use, for example, deionized water (ion exchange water), pure water, ultrapure water, distilled water, and the like, as water.

<Other Components>

The dispersion according to one aspect of the present invention and the dispersion to be manufactured by the manufacturing method of present invention may contain other components unless the effects of the present invention are impaired. The other components are not particularly limited, and an antifoaming agent, a plasticizer, and the like can be used.

(Plasticizer)

The plasticizer is not particularly limited, and a water-soluble plasticizer such as polyethylene glycol and glycerin can be used, or a phthalate ester-based plasticizer such as dibutyl phthalate, or the like can be used as a type of plasticizer that is insoluble in water and transitions into emulsion.

The content of the plasticizer in the dispersion for a silicon carbide sintered body is not particularly limited, but a lower limit of the content of the plasticizer is preferably greater than or equal to 0.1 mass %, is more preferably greater than or equal to 0.5 mass %, and is even more preferably greater than or equal to 1 mass %. In addition, an upper limit of the content of the plasticizer in the dispersion for a silicon carbide sintered body is preferably less than or equal to 30 mass %, is more preferably less than or equal to 20 mass %, and is even more preferably less than or equal to 10 mass %. According to such a range, the stability and the handleability of the dispersion are improved. In addition, it is possible to obtain a high quality silicon carbide sintered body.

(Antifoaming Agent)

The antifoaming agent is not particularly limited, and a silicone-based antifoaming agent, an aliphatic acid, higher alcohol, a polyalkylene derivative, a polyether derivative, and the like can be used.

The content of the antifoaming agent in the dispersion for a silicon carbide sintered body is not particularly limited, but a lower limit of the content of the antifoaming agent is preferably greater than or equal to 0.005 mass %, is more preferably greater than or equal to 0.01 mass %, and is even more preferably greater than or equal to 0.05 mass %. In addition, an upper limit of the content of the antifoaming agent in the dispersion for a silicon carbide sintered body is preferably less than or equal to 30 mass %, is more preferably less than or equal to 20 mass %, and is even more preferably less than or equal to 10 mass %. According to such a range, the stability and the handleability of the dispersion are improved. In addition, it is possible to obtain a high quality silicon carbide sintered body.

(pH)

The pH of the dispersion according to one aspect of the present invention is not particularly limited insofar as the pH at 25° C. is less than or equal to 7.0, but is preferably in a range of 2.0 to 7.0, from the viewpoint of having high dispersibility.

A pH adjusting agent for attaining the pH described above is not particularly limited, and a known pH adjusting agent that is capable of attaining desired pH can be suitably used. For example, it is preferable to use a known acid, a known base, a known salt, known amine, a known chelating agent, and the like.

(Viscosity)

The viscosity of the dispersion according to one aspect of the present invention is not particularly limited, but the viscosity of the dispersion at 25° C. immediately after being prepared is preferably 0.5 Pa·s to 100 Pa·s, and is more preferably 1 Pa·s to 50 Pa·s, from the viewpoint of increasing the dispersibility and the stability. In addition, it is preferable that the viscosity of the dispersion does not vary over time. Specifically, the viscosity of the dispersion after being stored at 25° C. for 7 days preferably falls within ±20%, and more preferably falls within ±10%, with respect to the viscosity of the dispersion immediately after being prepared. Note that, the viscosity of the dispersion can be measured by a method described in Examples described below.

(Manufacturing Method of Dispersion for Silicon Carbide Sintered Body)

<Mixing Step>

The manufacturing method of the present invention includes the mixing step of mixing the water dispersion containing silicon carbide particles, the water dispersion containing boron nitride particles, and the aqueous solution containing the resin having a hydroxyl group.

In a preferred embodiment, the manufacturing method of the present invention further includes, before the mixing step, at least one of: a preparing step for a water dispersion containing silicon carbide particles of adding a charge control agent and an acid to a raw dispersion containing silicon carbide particles such that pH is in a range of greater than or equal to 9.0 and less than or equal to 12.0, thereby forming coated silicon carbide particles including a coating layer containing a charge control component on a surface of the silicon carbide particles to prepare a water dispersion containing silicon carbide particles; and a preparing step for a water dispersion containing boron nitride particles of adding a solution containing a functional polymer to a raw dispersion containing boron nitride particles, thereby forming coated boron nitride particles including a coating layer containing the functional polymer on a surface of the boron nitride particles to prepare a water dispersion containing boron nitride particles.

A method of mixing the water dispersion containing silicon carbide particles, the water dispersion containing boron nitride particles, and the aqueous solution containing the resin having a hydroxyl group is not particularly limited, and for example, preferably includes step (1) of respectively preparing a water dispersion containing silicon carbide particles (a first liquid), a water dispersion containing boron nitride particles having charges of the same sign as that of the silicon carbide particles (a second liquid), and an aqueous solution of a resin having a hydroxyl group (a third liquid), step (2) of kneading the first liquid and the second liquid, and step (3) of adding the third liquid to a mixed liquid obtained in step (2) and further kneading the resultant mixture. In general, the viscosity of the third liquid that is the aqueous solution containing the resin having a hydroxyl group is higher than that of the first liquid and the second liquid, and thus, it is preferable that the first liquid and the second liquid are kneaded in advance, and then, the third liquid is added since the dispersibility of the silicon carbide particles and the boron nitride particles is further improved.

(Step (1))

In (step (1)), the water dispersion containing silicon carbide particles (the first liquid), the water dispersion containing boron nitride particles having charges of the same sign as that of the silicon carbide particles (the second liquid), and the aqueous solution of the resin having a hydroxyl group (the third liquid) are respectively prepared.

A preparation method of the water dispersion containing silicon carbide particles (the first liquid) is not particularly limited. A commercially available product may be used, or a synthetic product may be used, as the water dispersion containing silicon carbide particles. The water dispersion containing silicon carbide particles may be prepared by using the water dispersion containing silicon carbide particles that are obtained by the method described in <Manufacturing Method of Coated Silicon Carbide Particles Including Coating Layer Containing Charge Control Component>. At this time, it is preferable to adjust the pH of the water dispersion (the first liquid) such that the pH of the final dispersion has a desired value of less than or equal to 7.0. For example, it is possible to adjust the pH of the water dispersion after the coating layer is formed on the silicon carbide particles by the method described above to desired pH by using an acid or an alkali. In addition, as necessary, it is preferable to adjust the concentration of the silicon carbide particles in the first liquid to be 40 mass % to 60 mass % by a method such as water addition or condensation.

A preparation method of the water dispersion containing boron nitride particles (the second liquid) is not particularly limited. A commercially available product may be used, or a synthetic product may be used, as the water dispersion containing boron nitride particles. The water dispersion containing boron nitride particles may be prepared by using the water dispersion containing boron nitride particles that are obtained by the method described in <Manufacturing Method of Boron Nitride Particles on which Functional Polymer is Adsorbed>. At this time, it is preferable to adjust the pH of the water dispersion (the second liquid) such that the pH of the final dispersion has a desired value of less than or equal to 7.0. For example, it is possible to adjust the pH of the water dispersion after the functional polymer is adsorbed on the boron nitride particles by the method described above to desired pH by using an acid or an alkali. In addition, as necessary, it is preferable to adjust the concentration of the boron nitride particles in the second liquid to be 8 mass % to 50 mass % by a method such as water addition or condensation.

A preparation method of the aqueous solution of the resin having a hydroxyl group (third liquid) is not also particularly limited. At this time, it is preferable to adjust the pH of the aqueous solution (the third liquid) such that the pH of the final dispersion has a desired value of less than or equal to 7.0. The concentration of the resin having a hydroxyl group in the third liquid is not particularly limited, and for example, it is preferable to adjust the concentration to be 5 mass % to 40 mass %.

A specific form of water that is used as the dispersing medium/solvent at the time of preparing the first liquid, the second liquid, and the third liquid, and an acid that is used for adjusting the pH are as described above.

(Step (2))

In step (2), the first liquid and the second liquid, prepared as described above, are kneaded. A method of kneading the first liquid and the second liquid is not particularly limited. At this time, as necessary, other components such as a plasticizer and an antifoaming agent may be further added and mixed.

A kneading means is not particularly limited, and for example, a known kneading stirring machine of the related art, such as a planetary centrifugal mixer and a planetary mixer, can be used. A kneading time, for example, is approximately 5 minutes to 30 minutes. At this time, it is preferable to perform kneading under vacuum, from the viewpoint of preventing air bubbles from being generated during the kneading.

(Step (3))

In step (3), the third liquid prepared as described above is added to the mixed liquid obtained in step (2), and is further kneaded.

A method of adding and mixing the third liquid is not particularly limited. In addition, a kneading method is not also particularly limited, and for example, a known kneading stirring machine of the related art, such as a planetary centrifugal mixer and a planetary mixer, can be used. A kneading time, for example, is approximately 5 minutes to 60 minutes. At this time, it is preferable to perform kneading under vacuum, from the viewpoint of preventing air bubbles from being generated during the kneading.

(Green Sheet for Silicon Carbide Sintered Body)

One embodiment of the present invention relates to a green sheet for a silicon carbide sintered body that is formed by using the dispersion for a silicon carbide sintered body described above. In addition, another embodiment of the present invention relates to a manufacturing method of the green sheet for a silicon carbide sintered body including a step of obtaining a dispersion for a silicon carbide sintered body by the manufacturing method of the dispersion for a silicon carbide sintered body, and applying the dispersion for a silicon carbide sintered body to a base material. The dispersion for a silicon carbide sintered body according to the present invention, and the dispersion for a silicon carbide sintered body obtained by the manufacturing method of the present invention are excellent in the dispersibility of the silicon carbide particles and the boron nitride particles, and have high stability. For this reason, in the green sheet using the above, the silicon carbide particles and the boron nitride particles homogeneously exist at a high density, the resin is less likely to be separated, and the number of air gaps is small. For this reason, it is possible to manufacture a silicon carbide sintered body having a high strength.

A preparation method of the green sheet is not particularly limited, and for example, a method of forming a sheet by applying the dispersion for a silicon carbide sintered body described above to a base material can be used.

The base material is not particularly limited, and for example, a polyolefin film (polyethylene, polypropylene, and the like), a polyester film (polyethylene terephthalate (PET), polyethylene naphthalate, and the like), and a resin film such as polyvinyl chloride can be preferably used.

The thickness of the base material is not particularly limited, and for example, is 10 µm to 300 µm, and is preferably 20 µm to 150 µm.

A coating method of the dispersion for a silicon carbide sintered body is not particularly limited, and any known method can be used, and for example, a bar coating method, a die coater method, a comma coating method, a gravure roll coater method, a blade coater method, a spray coater method, an air knife coating method, a dip coating method, a transfer method, and the like can be used.

The thickness of a layer that is obtained by being coated with the dispersion for a silicon carbide sintered body is not particularly limited, but is preferably 100 µm to 2000 µm, from the viewpoint of the productivity and crack suppression.

(Prepreg Material for Silicon Carbide Sintered Body)

One embodiment of the present invention is a prepreg material for a silicon carbide sintered body that is formed from the green sheet for a silicon carbide sintered body described above. Another embodiment of the present invention relates to a manufacturing method of the prepreg material for a silicon carbide sintered body including a step of obtaining a green sheet for a silicon carbide sintered body by the manufacturing method of the green sheet for a silicon carbide sintered body, and laminating the green sheet for a silicon carbide sintered body on a fiber base material.

The prepreg material is a composite material in a semi-cured state, which is prepared by impregnating a dispersion containing a resin in a fiber base material such as a glass cloth, a silicon carbide fiber, and a carbon fiber, and by performing drying.

In a general preparation method, the prepreg material is manufactured by impregnating a dispersion in a fiber base material, and by evaporating a solvent in a drying step to be removed. The impregnation can be performed by immersing, coating, or the like, and as necessary, can also be repeated a plurality of times.

Alternatively, the prepreg material can be manufactured by laminating a sheet-shaped green sheet on a fiber base material. In addition, such a method and the method of impregnating the dispersion in the fiber base material are combined, and thus, the prepreg material can also be manufactured.

The prepreg material of this embodiment can be a silicon carbide sintered body by being sintered, and can be used as a silicon carbide fiber-reinforced silicon carbide composite material (a silicon carbide/silicon carbide composite material). The silicon carbide/silicon carbide composite material has excellent physical properties such as lightweight, high thermal resistance, a high hardness, and high fracture toughness, and can be used as a material having thermal resistance and environment resistance.

EXAMPLES

The present invention will be described in more detail by using Examples and Comparative Examples described below. However, the technical scope of the present invention is not limited only to Examples described below. Note that, unless stated otherwise, "%" and "parts" indicate "mass %" and "parts by mass", respectively. In addition, in Examples and Comparative Examples described below, unless stated otherwise, the operation was performed in a condition of a room temperature (25° C.)/relative humidity of 40% RH to 50% RH.

Example 1

[Preparation of Water Dispersion of Silicon Carbide (SiC) Particles (First Liquid)]

20 mass % of a water dispersion of silicon carbide particles (GC #40000, an average secondary particle size of 0.36 µm, manufactured by FUJIMI INCORPORATED, a powder) was prepared, and 1 M of an aqueous solution of NaOH was added such that pH was 10.0. Then, 30 mass % of a water dispersion of sodium aluminate was prepared, the water dispersion of sodium aluminate in which the amount of sodium aluminate was 50 parts by mass with respect to 100 parts by mass of the silicon carbide particles, and 9.9 mass % of a nitric acid were added for 45 minutes while being stirred such that pH of 9.0 to 11.0 was retained. After that, stirring was further performed for 45 minutes, and then, 9.9 mass % of a nitric acid was added such that pH was 10.5, and thus, a water dispersion containing the silicon carbide particles coated with aluminum hydroxide was prepared. After that, 9.9 mass % of a nitric acid was added such that pH was 3.0, and condensation was performed by suction filtration, and thus, a water dispersion in which the concentration of aluminum hydroxide coated silicon carbide particles was 50 mass % (a first liquid) was obtained.

[Preparation of Water Dispersion of Boron Nitride (BN) Particles (Second Liquid)]

35 mass % of an aqueous solution of poly(diallyl dimethyl ammonium chloride) (PDDA, manufactured by Sigma-Aldrich Japan K.K.) was added to 20 mass % of a water dispersion of boron nitride particles having an average secondary particle size of 3.07 μm such that PDDA was 2.0 parts by mass with respect to 100 parts by mass of the boron nitride particles, and thus, a dispersion containing the boron nitride particles coated with PDDA was prepared. After that, 9.9 mass % of a nitric acid was added such that pH was 3.0. As described above, a second liquid was obtained.

Note that, a change in a zeta potential of the boron nitride particles due to the addition of PDDA was observed, and thus, it was confirmed that the coating of PDDA proceeded.

[Preparation of Aqueous Solution of Resin Having Hydroxyl Group (Third Liquid)]

9.9 mass % of a nitric acid was added to 20 mass % of an aqueous solution of PVB (polyvinyl butyral, Product Name: KW-1, manufactured by SEKISUI CHEMICAL CO., LTD.) such that pH was 3.0. As described above, a third liquid was obtained.

[Preparation of Dispersion]

The second liquid and glycerin (manufactured by Wako Pure Chemical Industries, Ltd.) that is a plasticizer were added to the first liquid obtained as described above, and were kneaded for 15 minutes under vacuum (HIVIS MIX 2P-03 Type, manufactured by PRIMIX Corporation, was used). After that, the third liquid was put and kneaded for 30 minutes under vacuum, and thus, a dispersion of Example 1 was obtained. A mixing mass ratio of the dispersion that is finally obtained is Silicon Carbide Particles: Boron Nitride Particles:Resin:Plasticizer:Water of 3:2:3:1:25. The pH of the obtained dispersion was measured by a pH meter (Model Number: F-71) manufactured by HORIBA, Ltd.

Example 2

A dispersion of Example 2 was prepared as with Example 1 except that the first liquid, the second liquid, and the third liquid were respectively adjusted such that pH was 5.0.

Example 3

A dispersion of Example 3 was prepared as with Example 1 except that the first liquid, the second liquid, and the third liquid were respectively adjusted such that pH was 7.0.

Example 4

A dispersion of Example 4 was prepared as with Example 1 except that 9.9 mass % of a nitric acid in each preparation of the first liquid, the second liquid, and the third liquid was changed to 9.9 mass % of a hydrochloric acid.

Example 5

A dispersion of Example 5 was prepared as with Example 2 except that 20 mass % of the aqueous solution of PVB in the third liquid was changed to an aqueous solution that was diluted such that PVA (polyvinyl alcohol, Product Name: PVA-124, manufactured by Kuraray Co., Ltd.) was 16 mass %.

Comparative Example 1

A dispersion of Comparative Example 1 was prepared as with Example 2 except that 50 mass % of a water dispersion obtained by condensing 20 mass % of a water dispersion of silicon carbide particles (GC #40000, an average secondary particle size of 0.36 μm, manufactured by FUJIMI INCORPORATED, a powder) with suction filtration was used as the first liquid, and 20 mass % of a water dispersion of boron nitride particles was used as the second liquid.

Comparative Example 2

A dispersion of Comparative Example 2 was prepared as with Comparative Example 1 except that the first liquid, the second liquid, and the third liquid were respectively adjusted such that pH was 9.0.

Comparative Example 3

A dispersion of Comparative Example 3 was prepared as with Example 3 except that 20 mass % of a water dispersion of boron nitride particles was used as the second liquid.

Comparative Example 4

A dispersion of Comparative Example 4 was prepared as with Example 3 except that 50 mass % of a water dispersion obtained by condensing 20 mass % of a water dispersion of silicon carbide particles (GC #40000, an average secondary particle size of 0.36 μm, manufactured by FUJIMI INCORPORATED, a powder) with suction filtration was used as the first liquid.

Comparative Example 5

A dispersion of Comparative Example 5 was prepared as with Example 1 except that the first liquid, the second liquid, and the third liquid were respectively adjusted such that pH was 10.0.

Note that, in each of Examples and Comparative Examples, in a case where the water dispersion (the first liquid, the second liquid, and the third liquid) was adjusted to an acidic side, 9.9 mass % of a nitric acid (in Example 4, 9.9 mass % of a hydrochloric acid) was used, and in a case where the water dispersion was adjusted to an alkaline side, 1 M of an aqueous solution of NaOH was used.

(Composition and Structure Analysis)

Approximately 2 mL of the water dispersion of the silicon carbide particles (the first liquid), used in each of Examples and Comparative Examples, was sampled, and was dropped onto a filter (Nuclepore of 5 μm) (manufactured by Whatman, Inc.). Subsequently, suction filtration was performed, and after that, the powder on the filter was washed by using 10 mL of pure water, and the silicon carbide particles were dried. Then, the silicon carbide particles after being dried were sampled on a Si wafer, and SEM (Scanning Electron Microscope)-EDX (Energy Dispersive X-ray Spectroscopy) observation was performed by using a scanning electron microscope SU-8000 manufactured by Hitachi High-Technologies Corporation.

In addition, the silicon carbide particles after being dried were sampled on a carbon tape, and EELS (Electron Energy Loss Spectroscopy) analysis was performed by using TITAN 80-300 manufactured by FEI Company.

Here, in the SEM-EDX observation of the silicon carbide particles, when C, Al, and O were selected as an observation target element, in a case where an EDX spectrum of Al was observed and where it can be confirmed that a position in which an EDX spectrum of C, Al, and O was observed definitely corresponds to a position in which a particle is observed in an SEM observation image, it was judged that the silicon carbide particles were coated with a component containing Al and O.

In addition, in the EELS analysis of the silicon carbide particles, in a case where it can be confirmed that the observed EELS spectrum has a spectrum shape unique to an EELS standard spectrum of aluminum hydroxide ($Al(OH)_3$) (a shape different from the spectrum of Al and other compounds containing Al and O), it is possible to judge that the component containing Al and O contains $Al(OH)_3$.

As result of performing the analysis described above, it was confirmed that the silicon carbide particles used in Examples 1 to 5, Comparative Example 3, and Comparative Example 5 all contained $Al(OH)_3$ as a coating layer.

(Zeta Potential Measurement)

The water dispersion of the silicon carbide particles (the first liquid) and the water dispersion of the boron nitride particles (the second liquid), used in each of Examples and Comparative Examples, were respectively diluted with pure water, and by using 0.01 M to 0.1 M of NaOH and HCl as a pH adjusting agent, a zeta potential measurement liquid having arbitrary pH was prepared. That is, the pH of the zeta potential measurement liquid was adjusted to be the pH of the dispersion to be finally obtained by mixing the first liquid, the second liquid, and the third liquid in each of Examples and Comparative Examples. Here, the pH was measured at 25° C. by a pH meter (Model Number: F-71) manufactured by HORIBA, Ltd.

A zeta potential was measured by a zeta potential measurement apparatus (Product Name: "Zetasizer nano ZSP") manufactured by Malvern Instruments Limited. Here, the zeta potential was measured by using a refractive index of 1.760 and an absorption rate of 0.300, which are a representative value of general alumina, by using a refractive index of 2.170 and an absorption rate of 0.720 as a representative value of boron nitride, and by using a refractive index of 2.650 and an absorption rate of 0.900 as a representative value of silicon carbide, as a measurement particle condition.

The zeta potentials of the silicon carbide particles and the boron nitride particles are shown in Table 2 described below. In a case where the zeta potentials of the silicon carbide particles and the boron nitride particles have the same sign, excellent dispersibility can be obtained. Note that, determination criteria for the dispersibility of the particles in Table 2 are as follows.

○: the zeta potentials of the silicon carbide particles and the boron nitride particles have the same sign, and x: the zeta potentials of the silicon carbide particles and the boron nitride particles have different signs.

In addition, in pH that is an isoelectric point of the silicon carbide particles and the boron nitride particles (pH at an isoelectric point), a sample having pH with 1.0 increments from pH 3.0 to pH 10.0 was prepared as the zeta potential measurement liquid, the pH of the zeta potential measurement liquid having pH with 1.0 increments from pH 3.0 to pH 10.0 described above was measured, and the pH at the isoelectric point was calculated by the equation described above from the pH before and after the sign of the zeta potential was changed and the zeta potential at the pH before and after the sign of the zeta potential was changed.

The value of the pH that is the isoelectric point of the silicon carbide particles used in each of Examples and Comparative Examples was 5.0 in silicon carbide particles not subjected to charge control, and was 8.6 in silicon carbide particles coated with aluminum hydroxide. In addition, the pH that is the isoelectric point of the boron nitride particles was 4.6 in boron nitride particles not subjected to charge control, and was 8.0 in boron nitride particles coated with PDDA.

(Average Secondary Particle Size)

An average secondary particle size of the silicon carbide particles was measured by a scattering particle size distribution measurement apparatus LA-950 manufactured by HORIBA, Ltd. In the silicon carbide particles, the measurement was performed by using 10 mass % of a water dispersion of silicon carbide particles obtained by diluting the water dispersion of the silicon carbide particles (the first liquid), used in each of Examples and Comparative Examples. The average secondary particle size of the silicon carbide particles coated with aluminum hydroxide was 0.42 μm.

In the boron nitride particles, the measurement was also performed by using 10 mass % of a water dispersion of boron nitride particles obtained by diluting the water dispersion of the boron nitride particles (the second liquid), used in each of Examples and Comparative Examples.

The average secondary particle size of the boron nitride particles coated with PDDA was 3.06 μm.

(Evaluation of Viscosity of Dispersion)

The viscosity of the dispersion obtained in each of Examples and Comparative Examples was measured, after lightly stirring the dispersion with the hand, by using a TVB10H type viscosity meter manufactured by Toki Sangyo Co., Ltd. in a condition of 1.0 rpm. In addition, an environmental temperature during the measurement was set to 25° C. The viscosity immediately after the dispersion was prepared and after the dispersion was stored at 25° C. for 7 days was measured. As criteria for the temporal stability, a case where the viscosity after 7 days falls within ±20% with respect to the viscosity immediately after the dispersion is prepared is considered as practicable.

○: the viscosity after 7 days is within ±20% with respect to the viscosity immediately after the dispersion is prepared, and x: the viscosity after 7 days is greater than ±20% with respect to the viscosity immediately after the dispersion is prepared.

Results are shown in Tables 1 and 2 described below.

TABLE 1

| | SiC particles | | | | BN particles | | | |
| --- | --- | --- | --- | --- | --- | --- | --- | --- |
| | Charge control | Coating layer | pH at isoelectric point | Average secondary particle size (μm) | Charge control | Coating layer | pH at isoelectric point | Average secondary particle size (μm) |
| Example 1 | Present | Al(OH)$_3$ | 8.6 | 0.42 | Present | PDDA | 8.0 | 3.06 |
| Example 2 | Present | Al(OH)$_3$ | 8.6 | 0.42 | Present | PDDA | 8.0 | 3.06 |
| Example 3 | Present | Al(OH)$_3$ | 8.6 | 0.42 | Present | PDDA | 8.0 | 3.06 |
| Example 4 | Present | Al(OH)$_3$ | 8.6 | 0.42 | Present | PDDA | 8.0 | 3.06 |
| Example 5 | Present | Al(OH)$_3$ | 8.6 | 0.42 | Present | PDDA | 8.0 | 3.06 |
| Comparative Example 1 | Absent | — | 5.0 | 0.36 | Absent | — | 4.6 | 3.07 |
| Comparative Example 2 | Absent | — | 5.0 | 0.36 | Absent | — | 4.6 | 3.07 |
| Comparative Example 3 | Present | Al(OH)$_3$ | 8.6 | 0.42 | Absent | — | 4.6 | 3.07 |
| Comparative Example 4 | Absent | — | 5.0 | 0.36 | Present | PDDA | 8.0 | 3.06 |
| Comparative Example 5 | Present | Al(OH)3 | 8.6 | 0.42 | Present | PDDA | 8.0 | 3.06 |

TABLE 2

| | Dispersibility of particles (SiC and BN) | | | | | | | Viscosity of dispersion (Pa·s) | | Temporal stability of viscosity of dispersion |
| --- | --- | --- | --- | --- | --- | --- | --- | --- | --- | --- |
| | Charge control of particles | | | | Zeta potential (mV) | | | Initial | After | |
| | SiC | BN | Resin | pH | SiC | BN | Determination | stage | 7 days | Determination |
| Example 1 | Present | Present | PVB | 3.0 | +35.3 | +40.5 | ○ | 2 | 2 | ○ |
| Example 2 | Present | Present | PVB | 5.0 | +30.3 | +25.3 | ○ | 3 | 3 | ○ |
| Example 3 | Present | Present | PVB | 7.0 | +22.6 | +10.5 | ○ | 4 | 4 | ○ |
| Example 4 | Present | Present | PVB | 3.0 | +36.5 | +40.5 | ○ | 2 | 2 | ○ |
| Example 5 | Present | Present | PVA | 5.0 | +30.3 | +25.3 | ○ | 45 | 48 | ○ |
| Comparative Example 1 | Absent | Absent | PVB | 5.0 | +0.9 | −10.4 | x | 17 | 14 | ○ |
| Comparative Example 2 | Absent | Absent | PVB | 9.0 | −47.7 | −42.8 | ○ | 549 | 78 | x |
| Comparative Example 3 | Present | Absent | PVB | 7.0 | +22.6 | −28.3 | x | 4 | 4 | ○ |
| Comparative Example 4 | Absent | Present | PVB | 7.0 | −27.1 | +10.5 | x | 4 | 4 | ○ |
| Comparative Example 5 | Present | Present | PVB | 10.0 | −29.8 | −38.6 | ○ | Greater than or equal to 4000 | 962 | x |

From the results of Table 2, it was confirmed that in the dispersion prepared in Examples 1 to 5, the dispersibility was excellent. In addition, the stability of the viscosity was excellent. On the other hand, it was confirmed that in the dispersion of Comparative Examples 1, 3, and 4 in which the silicon carbide particles and the boron nitride particles had charges of different signs, sufficient dispersibility was not obtained. In addition, in the dispersion of Comparative Examples 2 and 5 in which the pH of the dispersion was greater than 7.0, the stability of the viscosity of the dispersion was insufficient.

(Preparation of Green Sheet)

Example 6

Sheet molding was performed on a PET film (Thickness: 100 μm) by using the dispersion of Example 2, and by using an applicator having a gap of 1000 μm, and thus, a green sheet was obtained.

Comparative Example 6

A green sheet was prepared by the same procedure as that of Example 6 described above except that the dispersion of Example 2 was changed to the dispersion of Comparative Example 5.

Example 7

The green sheet prepared in Example 6 was laminated on a silicon carbide fiber woven fabric, and thus, a prepreg material was obtained.

Note that, this application is based on Japanese Patent Application No. 2018-069109 filed on Mar. 30, 2018 and Japanese Patent Application No. 2018-069128 filed on Mar. 30, 2018, and the disclosure of which is incorporated by reference in its entirety.

The invention claimed is:

1. A dispersion for a silicon carbide sintered body, comprising:
   silicon carbide particles;
   boron nitride particles;
   a resin having a hydroxyl group; and
   water,
   wherein the dispersion has a pH at 25° C. of less than or equal to 7.0;
   wherein the silicon carbide particles are subjected to charge control by aluminum hydroxide coating; and
   wherein the silicon carbide particles and the boron nitride particles have charges of the same sign.

2. The dispersion according to claim 1, wherein the boron nitride particles are subjected to charge control.

3. The dispersion according to claim 1, wherein the boron nitride particles are subjected to charge control by a cationic polymer.

4. The dispersion according to claim 1, wherein the resin having a hydroxyl group is selected from the group consisting of polyvinyl alcohol (PVA), polyvinyl butyral (PVB), a glyoxal resin, an acrylic resin, a phenol resin, hydroxyl group-containing polyvinyl pyrrolidone (PVP), hydroxyl group-containing polyester, hydroxyl group-containing silicone, and a hydroxyl group-containing polycarboxylic acid.

5. The dispersion according to claim 3, wherein the cationic polymer is poly(diallyl dimethyl ammonium chloride), poly(methacryloyloxyethyl trimethyl ammonium chloride), poly(acryl amide-co-diallyl dimethyl ammonium chloride), poly(dimethyl amine-co-epichlorohydrin-co-ethylene diamine), polyethylene imine, ethoxylated polyethylene imine, poly(amidoamine), poly(methacryloyloxyethyl dimethyl ammonium chloride), poly(vinyl pyrrolidone), poly(vinyl imidazole), poly(vinyl pyridine), or poly(vinyl amine).

6. The dispersion according to claim 1, wherein an average secondary particle size of the coated silicon carbide particles coated with aluminum hydroxide is less than or equal to 2 μm.

7. A green sheet for a silicon carbide sintered body, formed from the dispersion set forth in claim 1.

8. A prepreg material for a silicon carbide sintered body, formed from the green sheet for a silicon carbide sintered body set forth in claim 7.

9. A manufacturing method of a dispersion for a silicon carbide sintered body, comprising a mixing step of mixing:
   a water dispersion containing silicon carbide particles,
   a water dispersion containing boron nitride particles, and
   an aqueous solution containing a resin having a hydroxyl group,
   wherein the silicon carbide particles and the boron nitride particles have charges of the same sign, and a pH of the dispersion for a silicon carbide sintered body at 25° C. is less than or equal to 7.0,
   wherein the method further comprises, before the mixing step:
      a preparing step for a water dispersion containing silicon carbide particles of adding a charge control agent and an acid to a raw dispersion containing silicon carbide particles such that pH is in a range of greater than or equal to 9.0 and less than or equal to 12.0, thereby forming coated silicon carbide particles including a coating layer containing a charge control component on a surface of the silicon carbide particles to prepare a water dispersion containing silicon carbide particles; and
      in the preparing step for a water dispersion containing silicon carbide particles, the charge control agent is sodium aluminate.

10. The manufacturing method according to claim 9, further comprising, before the mixing step:
    a preparing step for a water dispersion containing boron nitride particles of adding a solution containing a functional polymer to a raw dispersion containing boron nitride particles, thereby forming coated boron nitride particles including a coating layer containing the functional polymer on a surface of the boron nitride particles to prepare a water dispersion containing boron nitride particles.

11. The manufacturing method according to claim 10, wherein in the preparing step for a water dispersion containing boron nitride particles, the functional polymer is a cationic polymer.

12. The manufacturing method according to claim 11, wherein the cationic polymer is poly(diallyl dimethyl ammonium chloride), poly(methacryloyloxyethyl trimethyl ammonium chloride), poly(acryl amide-co-diallyl dimethyl ammonium chloride), poly(dimethyl amine-co-epichlorohydrin-co-ethylene diamine), polyethylene imine, ethoxylated polyethylene imine, poly(amidoamine), poly(methacryloyloxyethyl dimethyl ammonium chloride), poly(vinyl pyrrolidone), poly(vinyl imidazole), poly(vinyl pyridine), or poly(vinyl amine).

13. The manufacturing method according to claim 9, wherein the resin having a hydroxyl group is selected from the group consisting of polyvinyl alcohol (PVA), polyvinyl butyral (PVB), a glyoxal resin, an acrylic resin, a phenol resin, hydroxyl group-containing polyvinyl pyrrolidone (PVP), hydroxyl group-containing polyester, hydroxyl group-containing silicone, and a hydroxyl group-containing polycarboxylic acid.

14. The manufacturing method according to claim 9, wherein an average secondary particle size of the coated silicon carbide particles is less than or equal to 2 μm.

15. A manufacturing method of a green sheet for a silicon carbide sintered body, comprising a step of obtaining a dispersion for a silicon carbide sintered body by the manufacturing method set forth in claim 9, and applying the dispersion for a silicon carbide sintered body to a base material.

16. A manufacturing method of a prepreg material for a silicon carbide sintered body, comprising a step of obtaining a green sheet for a silicon carbide sintered body by the manufacturing method set forth in claim 15, and laminating the green sheet for a silicon carbide sintered body on a fiber base material.

* * * * *